(12) United States Patent
White

(10) Patent No.: US 7,311,129 B1
(45) Date of Patent: Dec. 25, 2007

(54) TIRE BEAD SEATING AND INFLATING APPARATUS

(76) Inventor: William D White, P.O. Box 5791, Bradenton, FL (US) 34281

( * ) Notice: Subject to any disclaimer, the term of this patent is extended or adjusted under 35 U.S.C. 154(b) by 0 days.

(21) Appl. No.: 11/786,067

(22) Filed: Apr. 10, 2007

(51) Int. Cl.
*B60C 25/06* (2006.01)

(52) U.S. Cl. .................. 157/1.11; 156/1.17; 156/1.2; 73/146

(58) Field of Classification Search ............ 157/1, 157/1.11, 1.17, 1.2; 141/38, 95; 73/146
See application file for complete search history.

(56) References Cited

U.S. PATENT DOCUMENTS

| | | | |
|---|---|---|---|
| 3,552,469 A | | 1/1971 | Corless |
| 3,677,320 A | * | 7/1972 | Corless ............... 157/1.1 |
| 3,683,991 A | * | 8/1972 | Ruhland et al. ........... 157/1.1 |
| 3,736,975 A | | 6/1973 | Strang et al. |
| 3,805,871 A | | 4/1974 | Corless |
| 3,814,163 A | | 6/1974 | Charles |
| 3,866,654 A | | 2/1975 | Duquesne |
| 4,263,958 A | | 4/1981 | Corless |
| 5,042,547 A | | 8/1991 | Van De Sype |
| 5,247,982 A | * | 9/1993 | Miller ............... 157/1.1 |
| 5,509,456 A | | 4/1996 | Bonko et al. |
| 6,463,982 B1 | | 10/2002 | Doan |
| 7,188,518 B2 | | 3/2007 | Gonzaga |

* cited by examiner

*Primary Examiner*—Joseph J. Hail, III
*Assistant Examiner*—Anthony Ojini
(74) *Attorney, Agent, or Firm*—Charles J. Prescott

(57) ABSTRACT

A portable universal apparatus for seating a bead of a wide range of tire sizes onto a rim. An upright support frame includes a rim support surface and a rim retainer for securing the rim in a generally horizontal position atop the rim support surface. A tubular air ring includes an air inlet port connectable to an air tank and is vertically adjustably supportable on the support frame. A plurality of inwardly oriented air discharge tubes connectable to the air ring and selectable from different sets of lengths thereof cooperate with the vertical adjustability of the air ring to position the distal end of each of discharge tube in close proximity between a lower rim seal and a lower sealing bead of the tire to force the lower sealing downwardly into sealing engagement with the lower rim seal when compressed air is released from the air tank into the air ring and air discharge tubes.

13 Claims, 12 Drawing Sheets

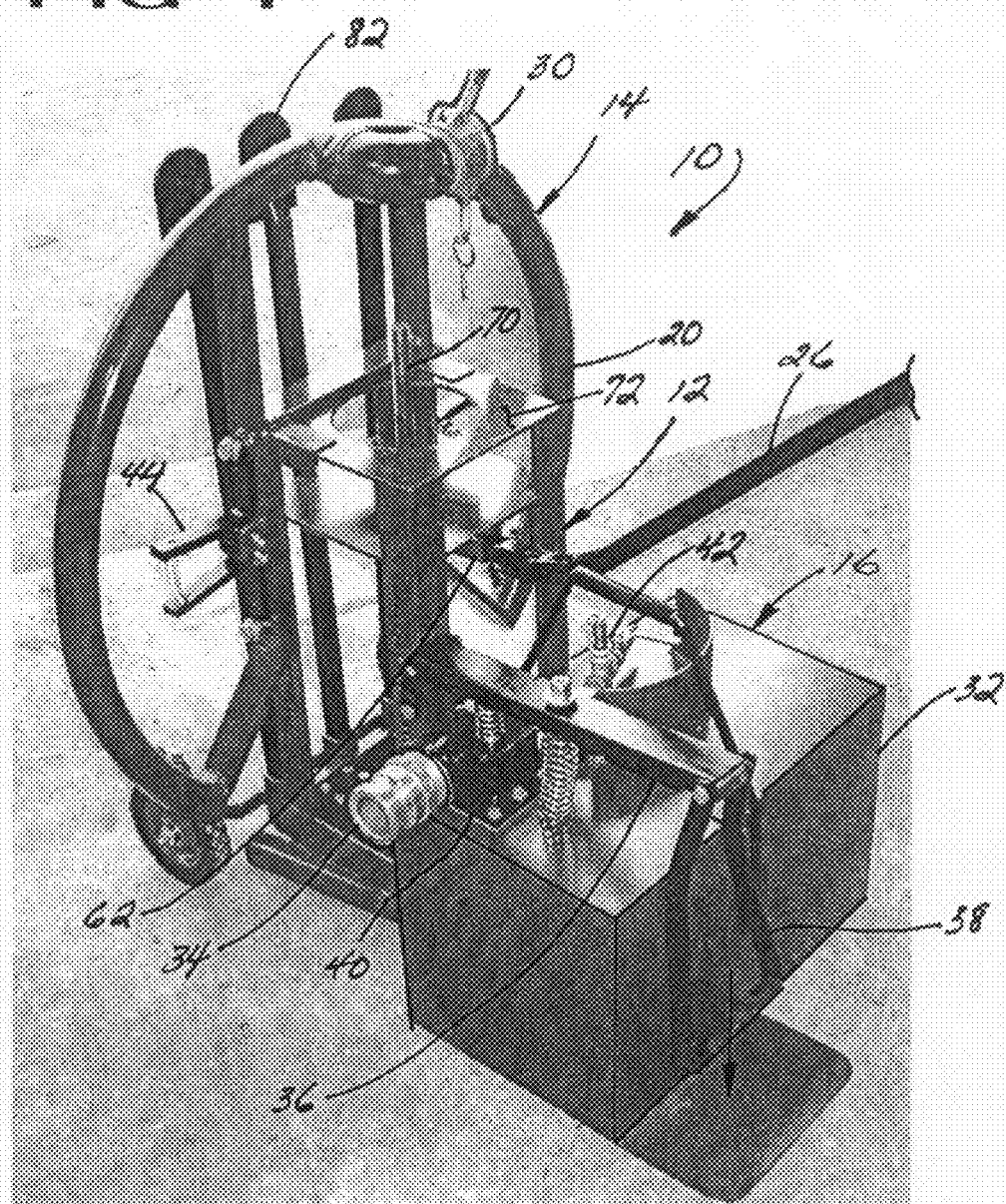

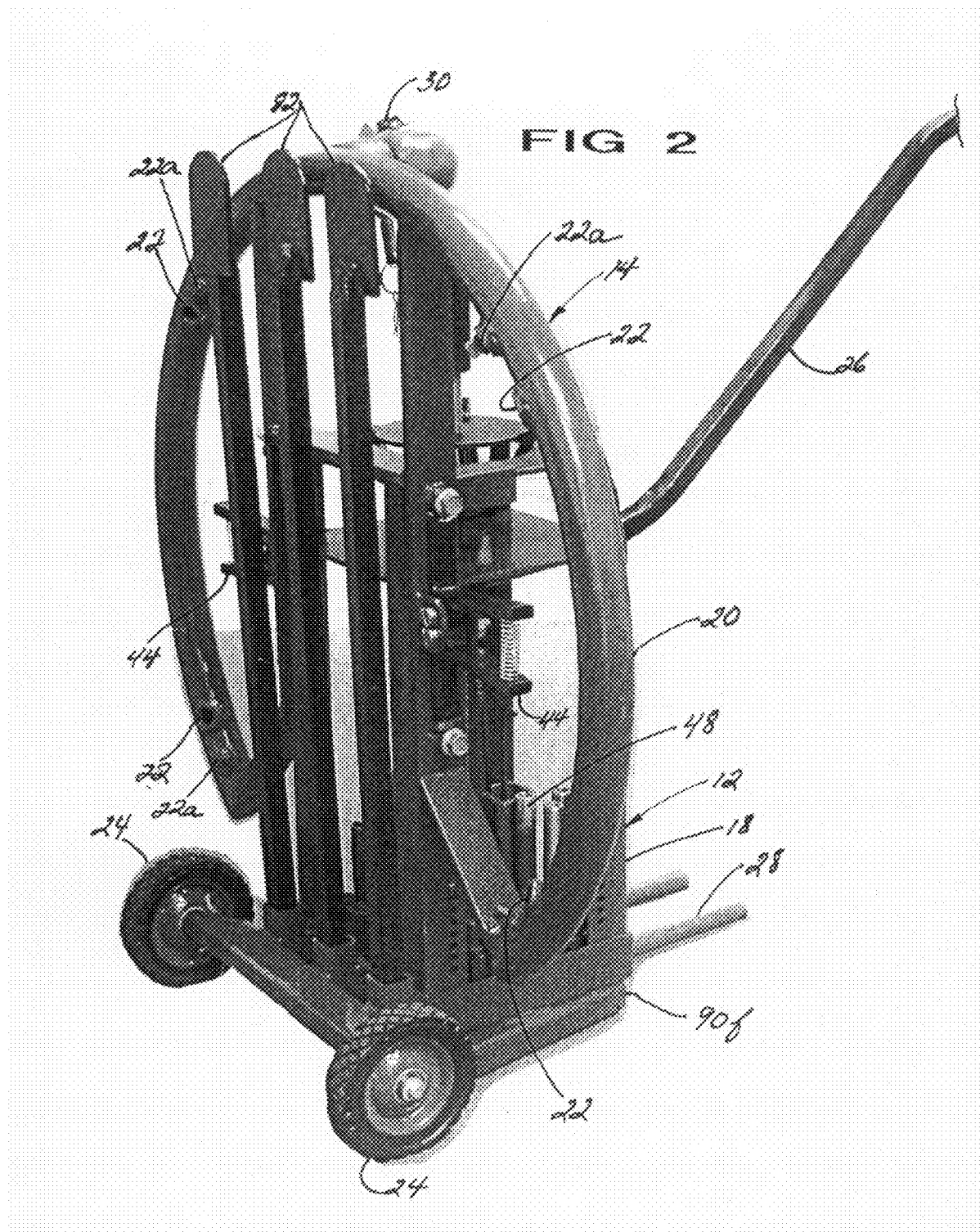

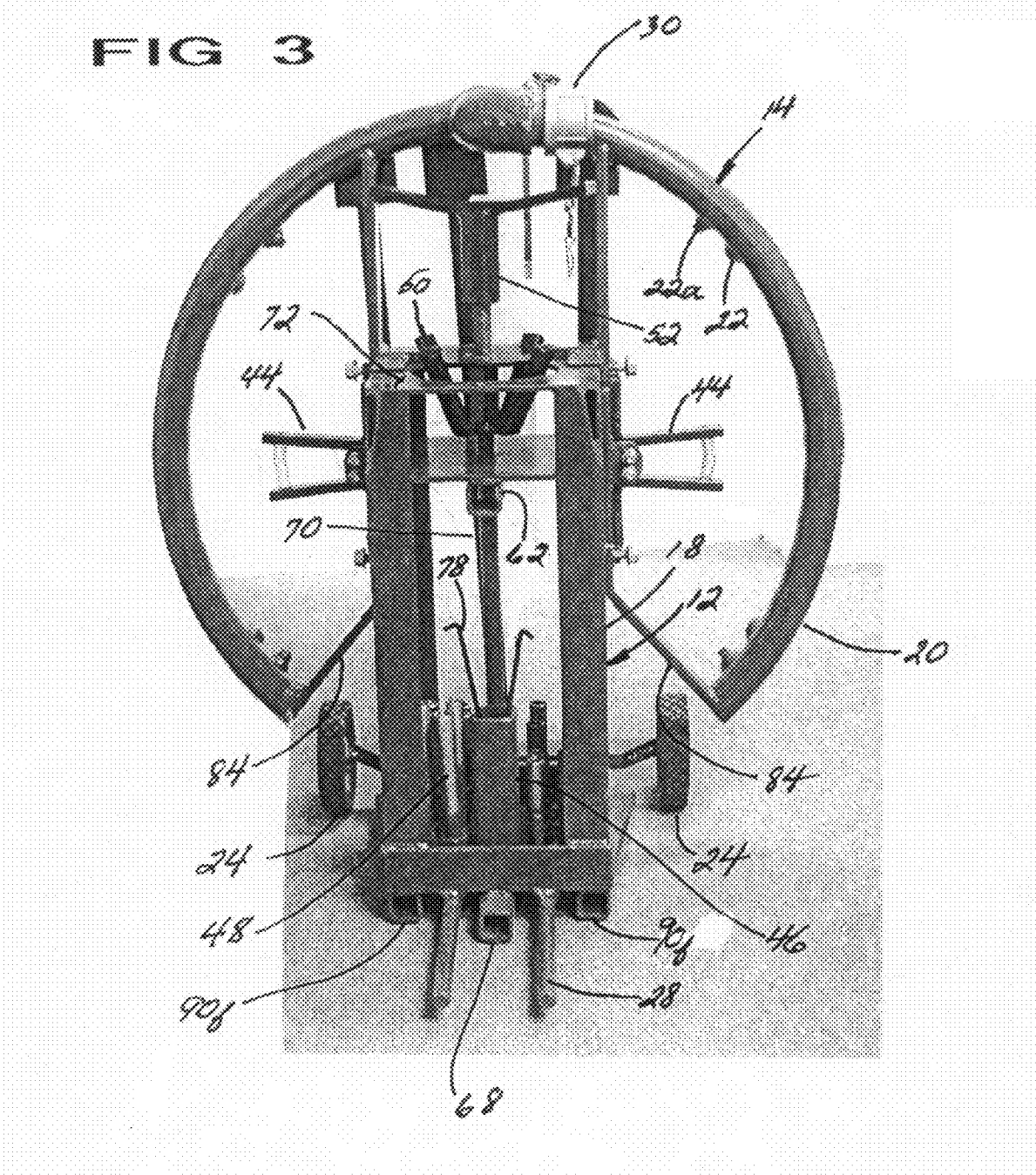

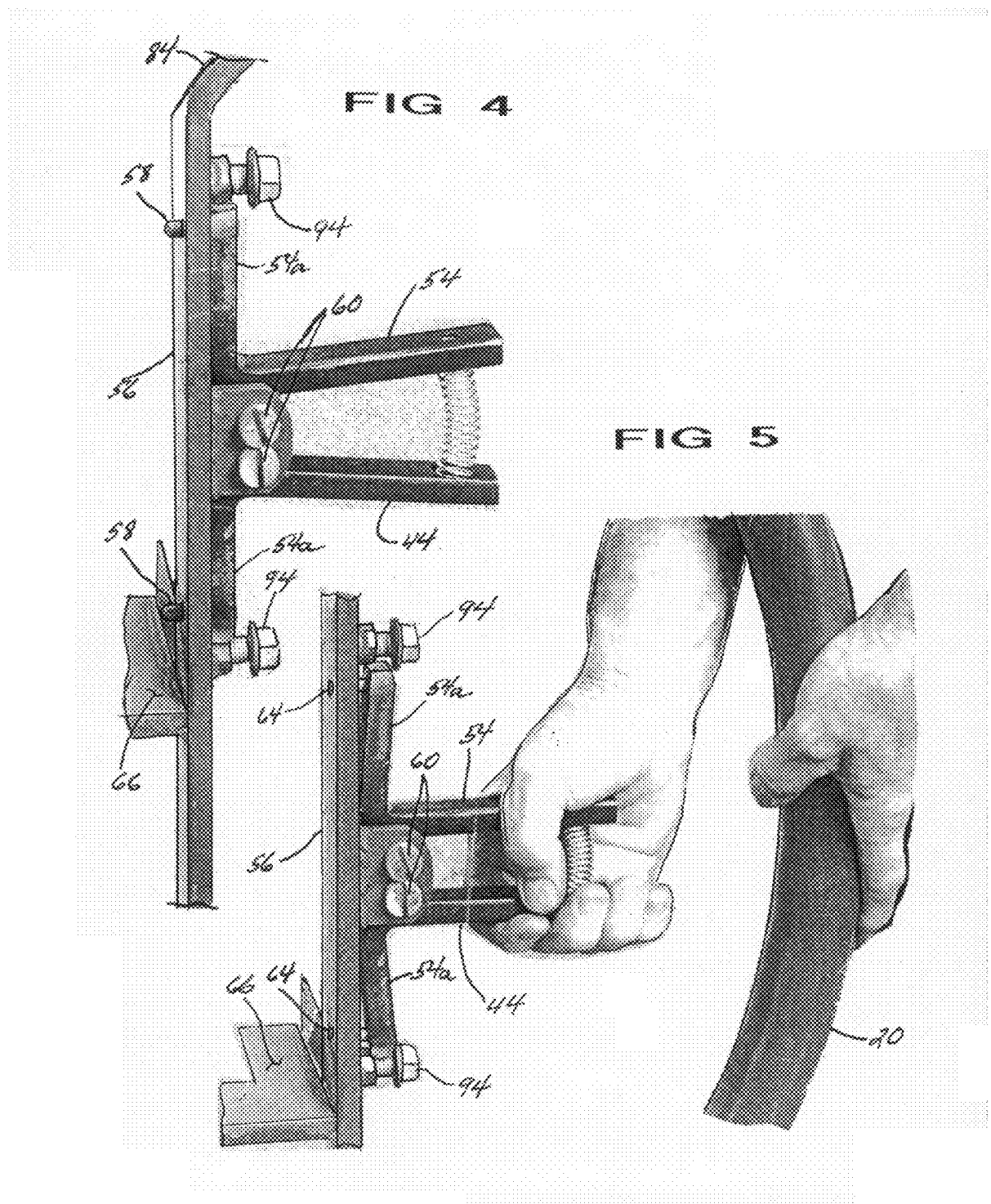

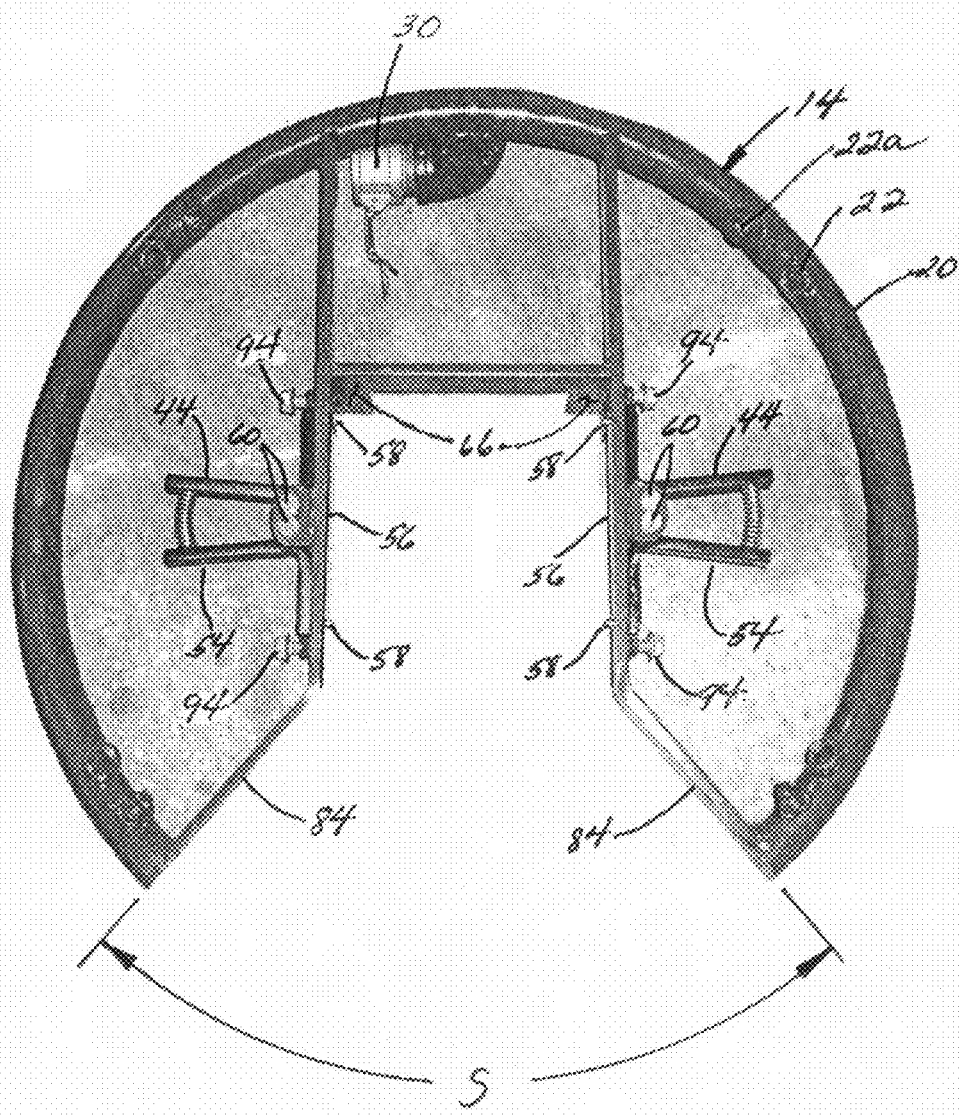

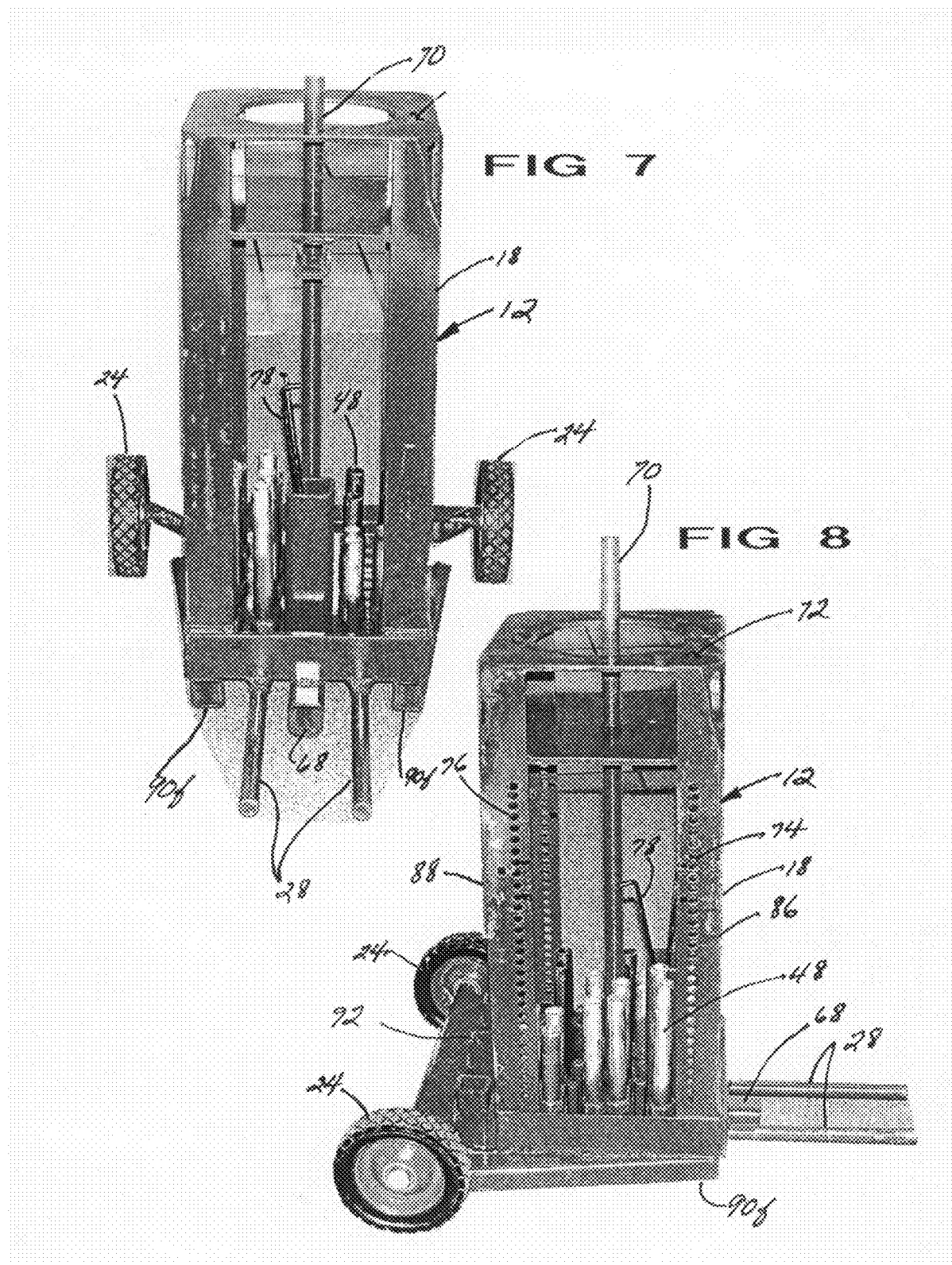

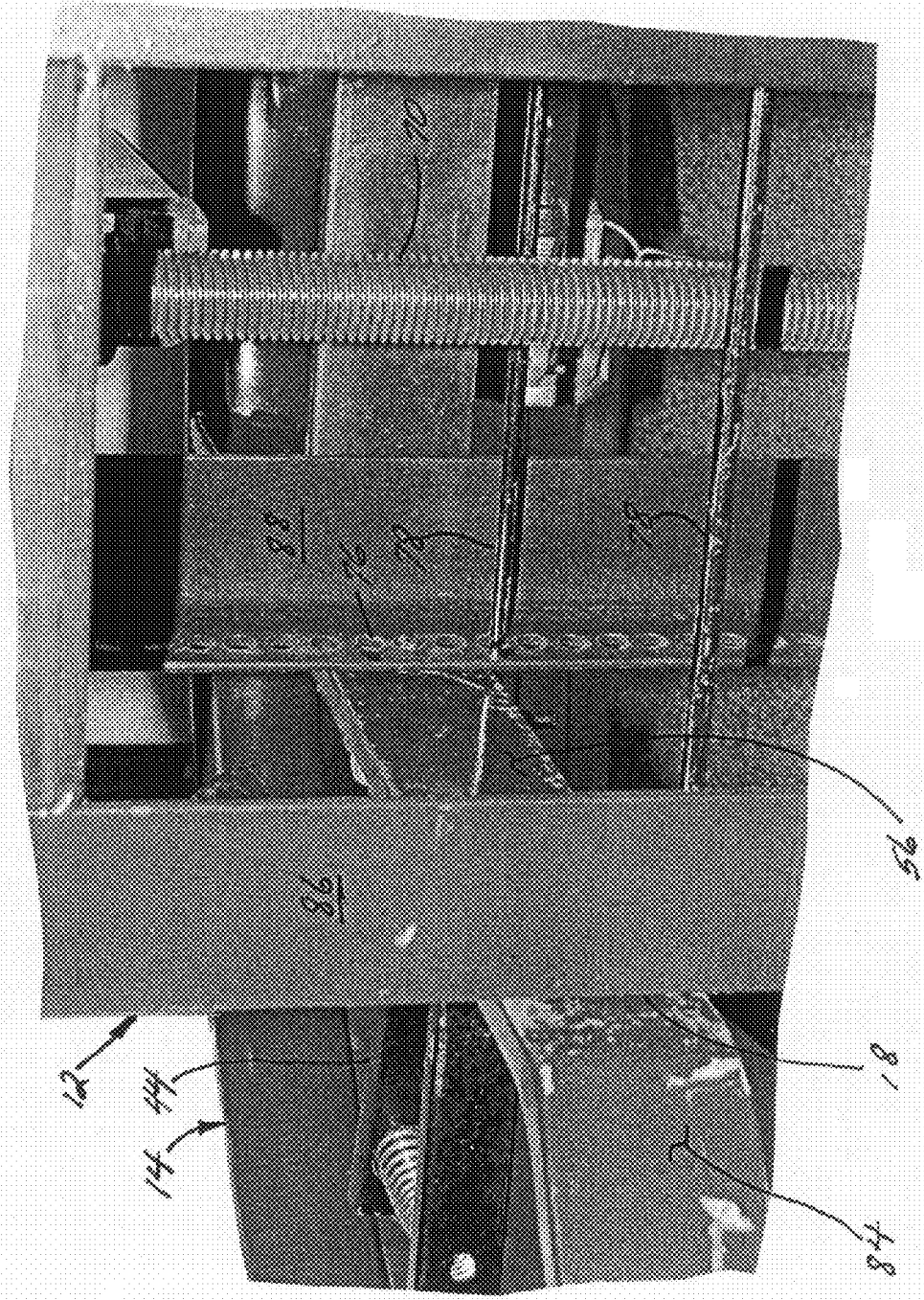

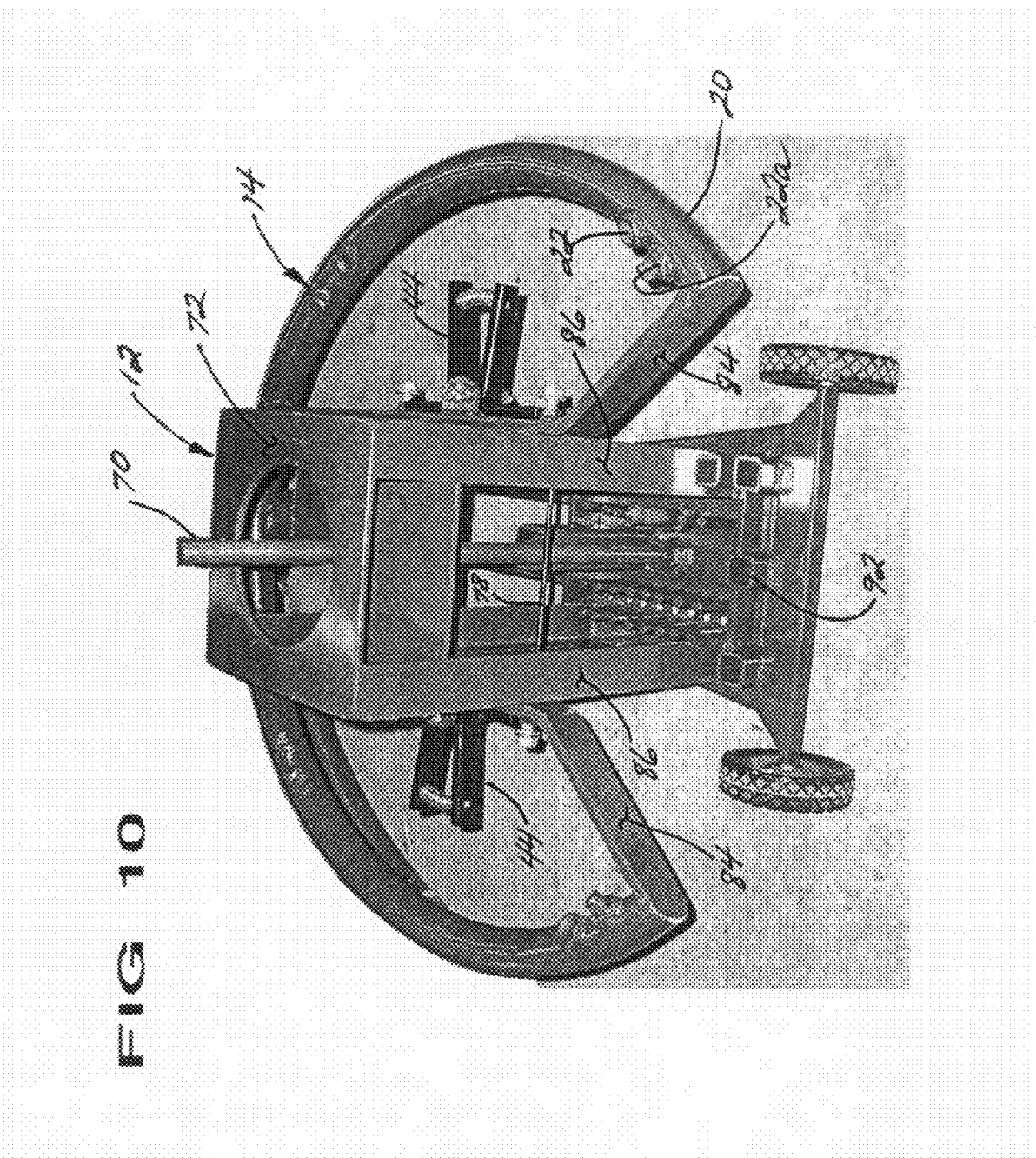

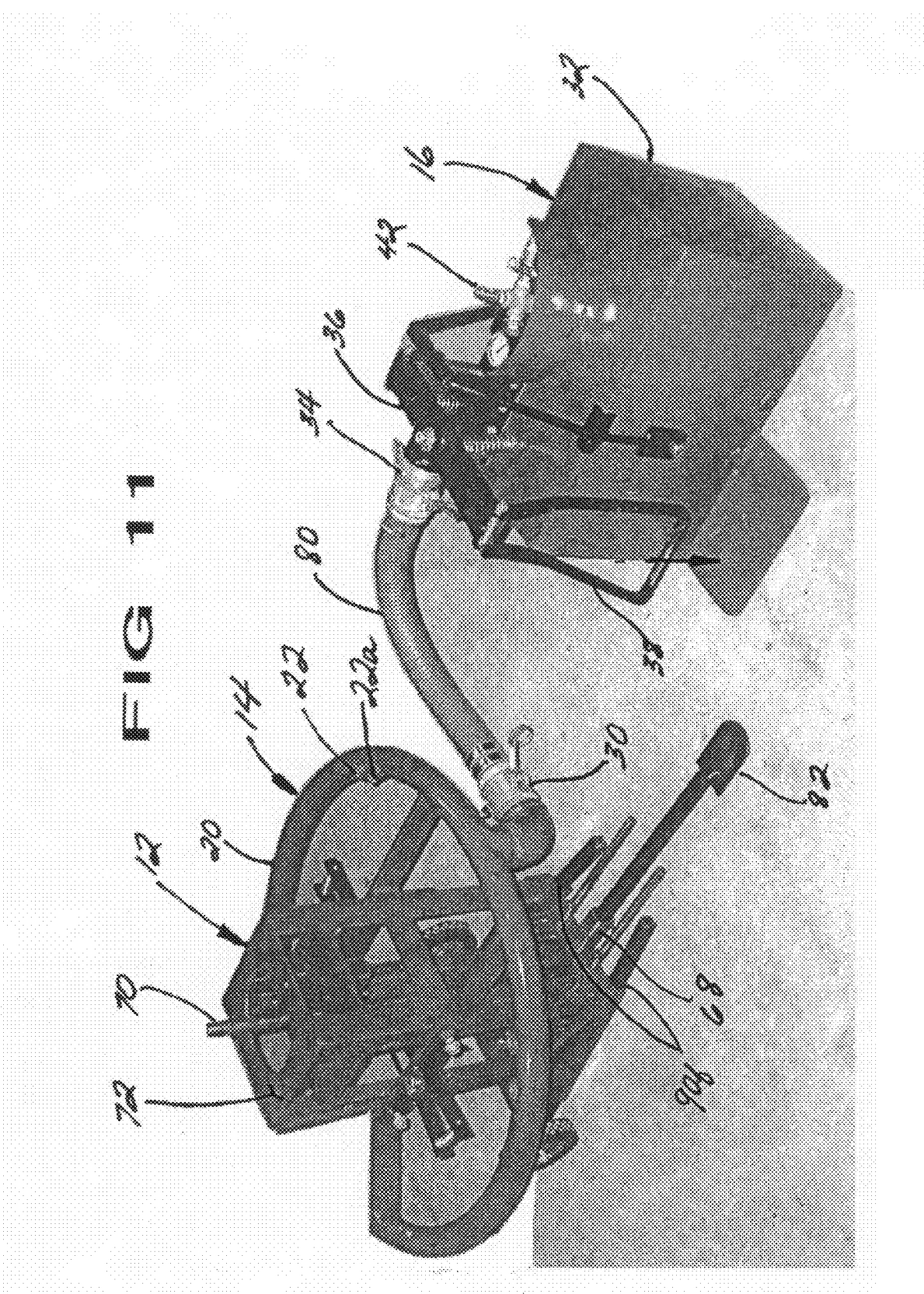

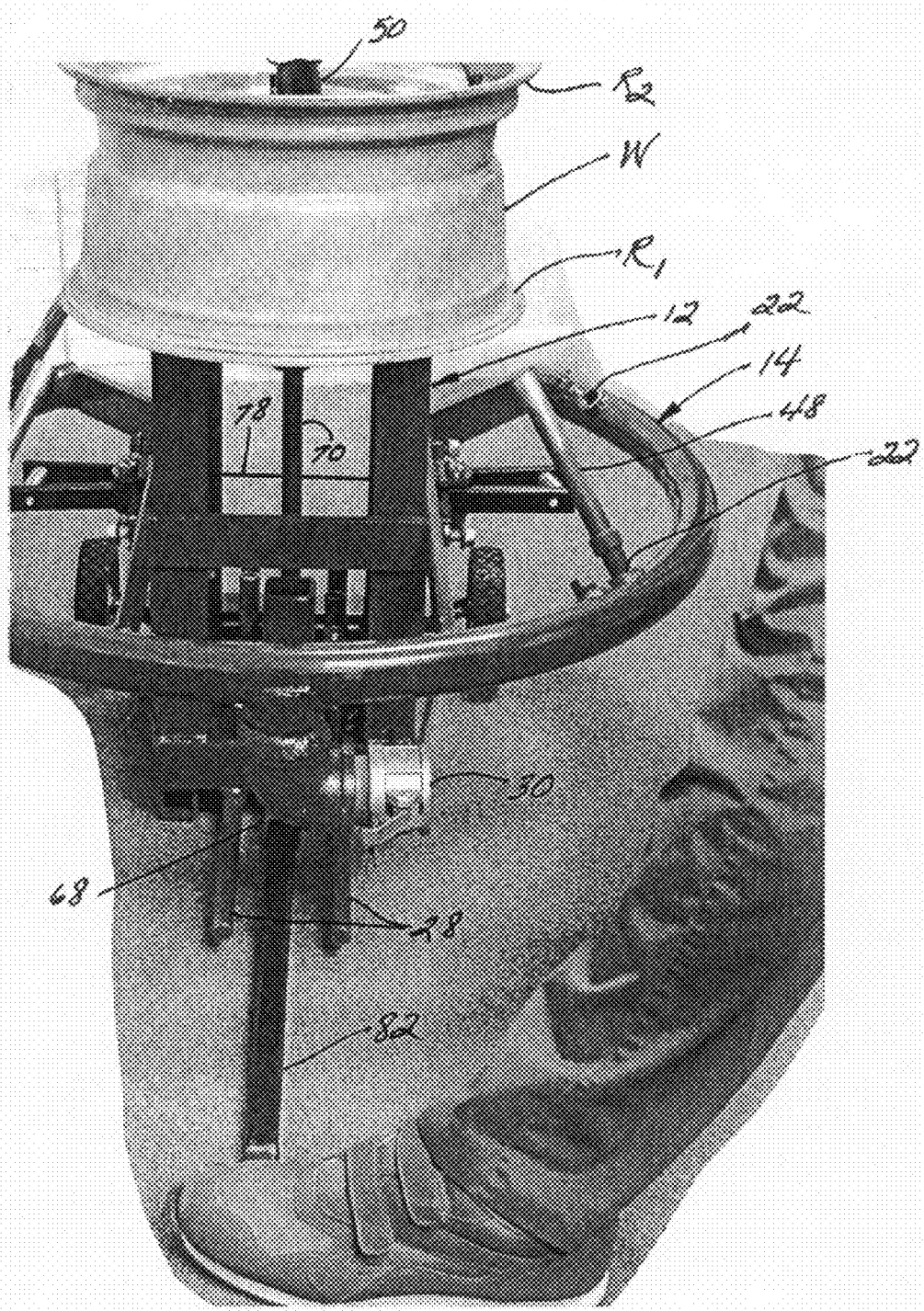

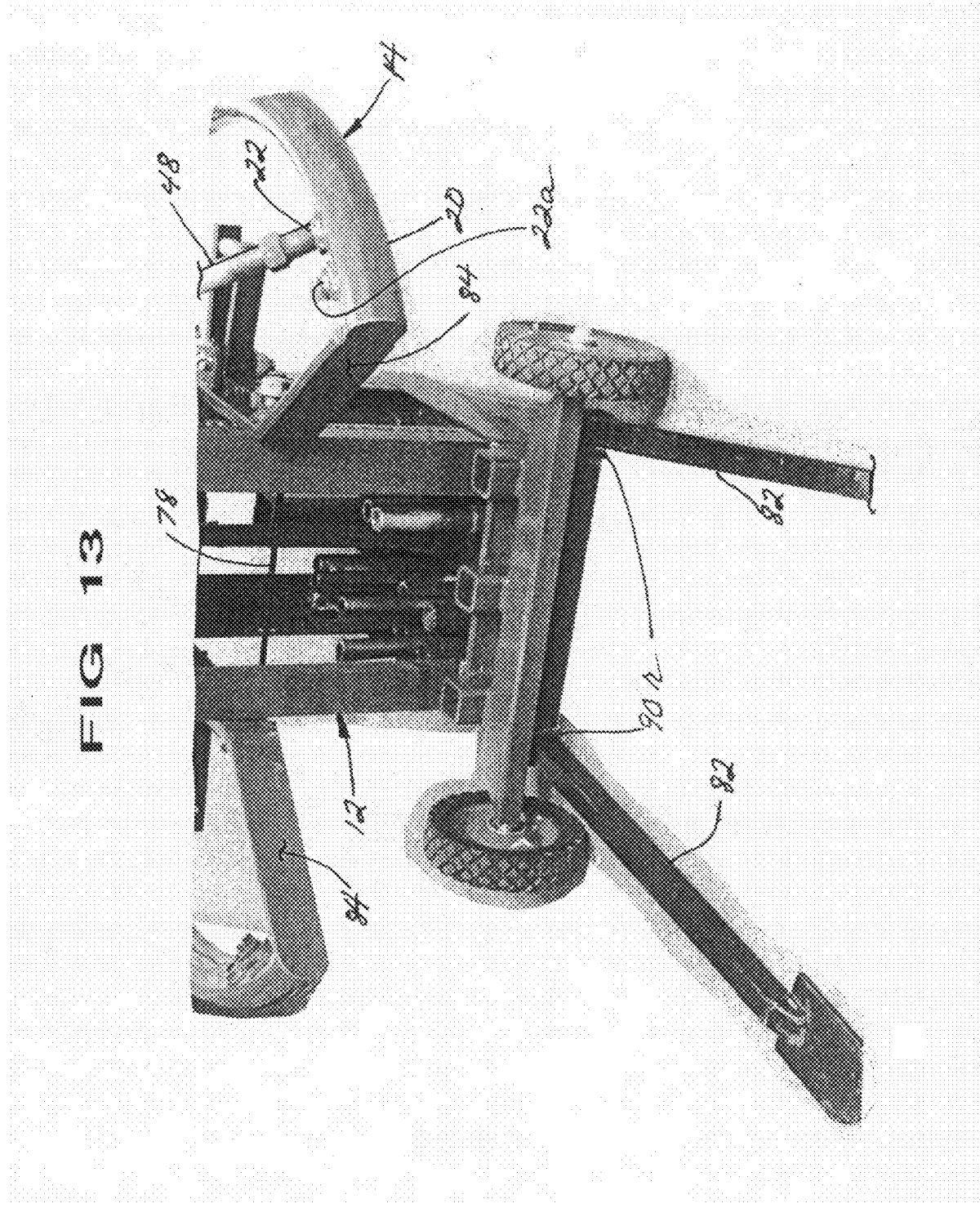

TIRE BEAD SEATING AND INFLATING APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to the installation of tubeless tires onto a rim and more particularly to an apparatus for effectively and quickly seating the sealing bead of larger sized tubeless tires.

2. Description of Related Art

Tubeless tires for automotive use have been used exclusively for perhaps several decades. With the advent of new rim design and mating sealing beads of tubeless tires, the need for preventing air leaks from the interior of the tire by the use of an inner tube has long since gone by the wayside. However, once the tubeless tire has been manipulated onto the rim of the wheel assembly, depending upon the overall rim width and overall size and stiffness of the tire, the minimal sealing of both beads in order to begin the process of air pressurization to fully seat the beads on the rim can be difficult.

With respect to more conventionally sized automotive tires, a number of prior art apparatus and devices are known to applicant to aid in this process. U.S. Pat. No. 5,042,547 to Van De Sype discloses a method and apparatus for inflating tubeless tires on a vehicle wheel with adjustable rim-engaging saddles. An inflation apparatus which is expandable radially to accommodate different sizes of tires is disclosed in U.S. Pat. No. 5,509,456 to Bonko, et al.

Corless has invented methods and apparatus for inflating tubeless tires in U.S. Pat. Nos. 3,552,469, 3,677,320, 3,805,871 and 4,263,958. The '320 patent teaches providing air simultaneously into the tire from the bead seating apparatus and through the conventional tire valve.

An adjustable bead seater for inflating tubeless tires is disclosed in U.S. Pat. No. 3,814,163 to Charles, et al. The apparatus comprises tire bead setting apparatus which includes a pair of oppositely disposed adjustable tubular segments. A newly-issued patent to Gonzaga describes a rapid inflation device for tubeless tires in U.S. Pat. No. 7,188,518.

Other patents of lesser interest are listed herebelow:
U.S. Pat. No. 3,866,654 to Duquesne
U.S. Pat. No. 3,736,975 to Strang, et al.
U.S. Pat. No. 6,029,716 to Hawk
U.S. Pat. No. 5,878,801 to Ellis
U.S. Pat. No. 6,405,780 to Biruk
U.S. Pat. No. 7,044,188 to Pellerin, et al.
U.S. Pat. No. 4,850,402 to Cunningham, et al.
U.S. Pat. No. 6,463,982 to Doan
U.S. Pat. No. 5,570,733 to Desparois, et al.
U.S. Pat. No. 6,148,892 to Koerner, et al.
U.S. Pat. No. 6,176,288 to Kane, et al.
U.S. Pat. No. 6,575,269 to Skoff, et al.
U.S. Pat. No. 5,247,982 to Miller Use of these tubeless designed tires and rims have also expanded into virtually all larger size tires including those of larger rim diameter and width in the range of up to 20" in rim width and tire diameters which can extend well above 30". The tubeless tires associated with these larger rims are extremely heavy and difficult to manipulate after they have been wrestled onto the rim in loosely fitting fashion. Typically one of the two beads will easily seat itself sufficiently against the corresponding rim seal while the other tire bead will remain displaced from the opposite side of rim seal. To establish a seal sufficient to trap air being introduced into the valve stem of the rim which will thereafter begin the inflation process, some means must be exerted on the tire to partially or temporarily seal the other bead. Again, because larger tires are substantially heavier and stiffer and, when being installed on wider rims, pose a particular challenge which none of the above recited prior art seem to have an answer to this initial sealing problem.

Other more radical means for manipulating the sidewall of the large tire into bead sealing engagement with the rim seats have been relied upon to establish this initial tire bead seal on both sides of the tire. An extreme example is in the form of directing a quantity of ether into the interior of the tire and then igniting that gas causing a mild explosion sufficient to drive the second tire wall and bead into initial sealing engagement with the rim seal.

The present invention provides an apparatus which (in prototype form substantially as shown herebelow) easily and quickly seats virtually any sized tubeless tire onto any corresponding rim, regardless of rim width or diameter. Once this apparatus easily establishes initial sealing contact between the rim seal and both beads of the tire, final inflation and full bead seating are quickly established thereafter.

Moreover, the present invention in preferably in the form of an apparatus which is portable and may be deployed on site where the need for heavy truck tire service would be most useful. Other available equipment which is intended but falls short of this process capability is typically far too large to be remotely deployed and therefore the tires to be repaired or replaced must be hauled along with the rim to the work warehouse or garage.

BRIEF SUMMARY OF THE INVENTION

This invention is directed to a portable universal apparatus for seating a bead of a wide range of tire sizes onto a rim. An upright support frame includes a rim support surface and a rim retainer for securing the rim in a generally horizontal position atop the rim support surface. A tubular air ring includes an air inlet port connectable to an air tank and is vertically adjustably supportable on the support frame. A plurality of inwardly oriented air discharge tubes connectable to the air ring and selectable from different sets of lengths thereof cooperate with the vertical adjustability of the air ring to position the distal end of each of discharge tube in close proximity between a lower rim seal and a lower sealing bead of the tire to force the lower sealing downwardly into sealing engagement with the lower rim seal when compressed air is released from the air tank into the air ring and air discharge tubes.

It is therefore an object of this invention to provide a portable apparatus which will easily and effectively establish the required bead sealing of tubeless tires onto tire rims quickly and reliably and requiring only minimal additional manual effort.

Yet another object of this invention is to provide a portable apparatus for sealing the bead of larger heavy equipment and off-road vehicles which incorporate large diameter rims and those of extreme width in conjunction with correspondingly larger tubeless tires.

Still another object of this invention is to provide a portable apparatus for establishing the required bead sealing of tubeless tires and which is easily and quickly adjustable to accommodate a broad range of rim diameters and widths and tire sizes.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 4 is an enlarged view of one of the air ring locking pin release levers.

FIG. 5 is a view of FIG. 4 in the released mode.

LIST OF COMPONENTS

| | |
|---|---|
| 10. | portable tire bead seating apparatus |
| 12. | main support frame assembly |
| 14. | air ring assembly |
| 16. | compressed air tank assembly |
| 18. | support frame |
| 20. | air ring |
| 22. | air ring outlet ports |
| 22a. | alternate angle air ring outlet ports |
| 24. | support wheel |
| 26. | removable handle |
| 28. | air tank assembly supports |
| 30. | air ring inlet port |
| 32. | compressed air tank |
| 34. | air tank outlet |

-continued

LIST OF COMPONENTS

| | |
|---|---|
| 36. | lever arm |
| 38. | foot pedal |
| 40. | air release valve |
| 42. | air pressure monitor |
| 44. | air ring locking member |
| 46. | Upright storage tube |
| 48. | air discharge tube |
| 50. | wheel rim retainer |
| 52. | rim lock |
| 54. | locking pin release lever |
| 54a. | outward lever arm |
| 56. | air ring mounting plate |
| 58. | air ring locking pins |
| 60. | pivot pin |
| 62. | handle support tube |
| 64. | locking pin aperture |
| 66. | air ring alignment surface |
| 68. | center foot hold down support tube |
| 70. | wheel mounting shaft |
| 72. | wheel support surface |
| 74. | positioning rod receiving hole |
| 76. | positioning rod receiving hole |
| 78. | air ring positioning rod |
| 80. | flexible air conduit |
| 82. | foot hold down member |
| 84. | air ring guide plates |
| 86. | frame corner angle |
| 88. | frame corner angle |
| 90. | foot hold down member support tube |
| 92. | storage receptacle |
| 94. | stops |
| W | wheel |
| $R_1$ | rim |
| $R_2$ | rim |
| S | open sector |
| T | tire |
| A | tire sealing bead |
| B | tire sealing bead |

DETAILED DESCRIPTION OF THE INVENTION

Figure 1:
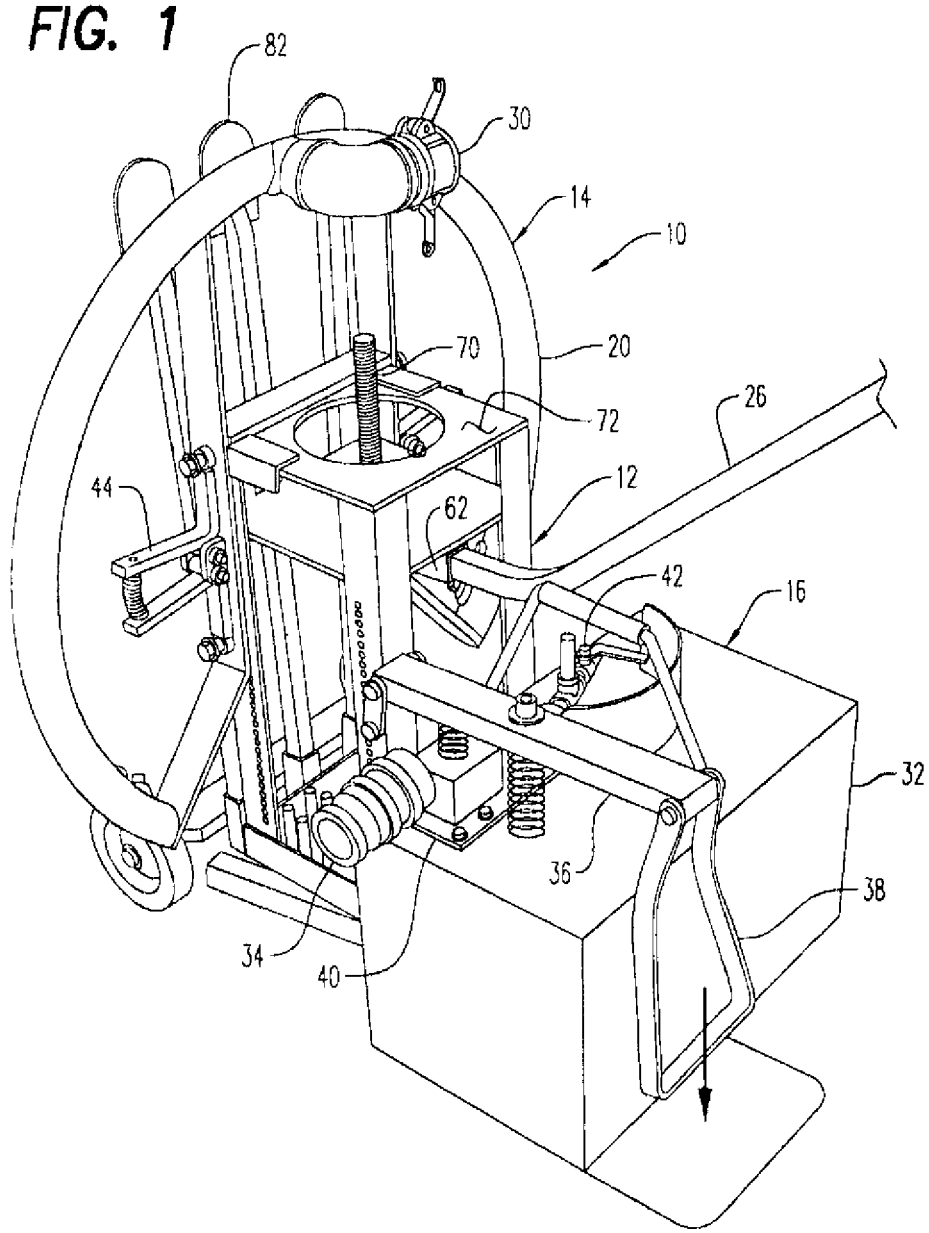
FIG. 1 is a perspective view of the invention in a stored configuration with the pull handle deployed ready for transport.
Figure 2:
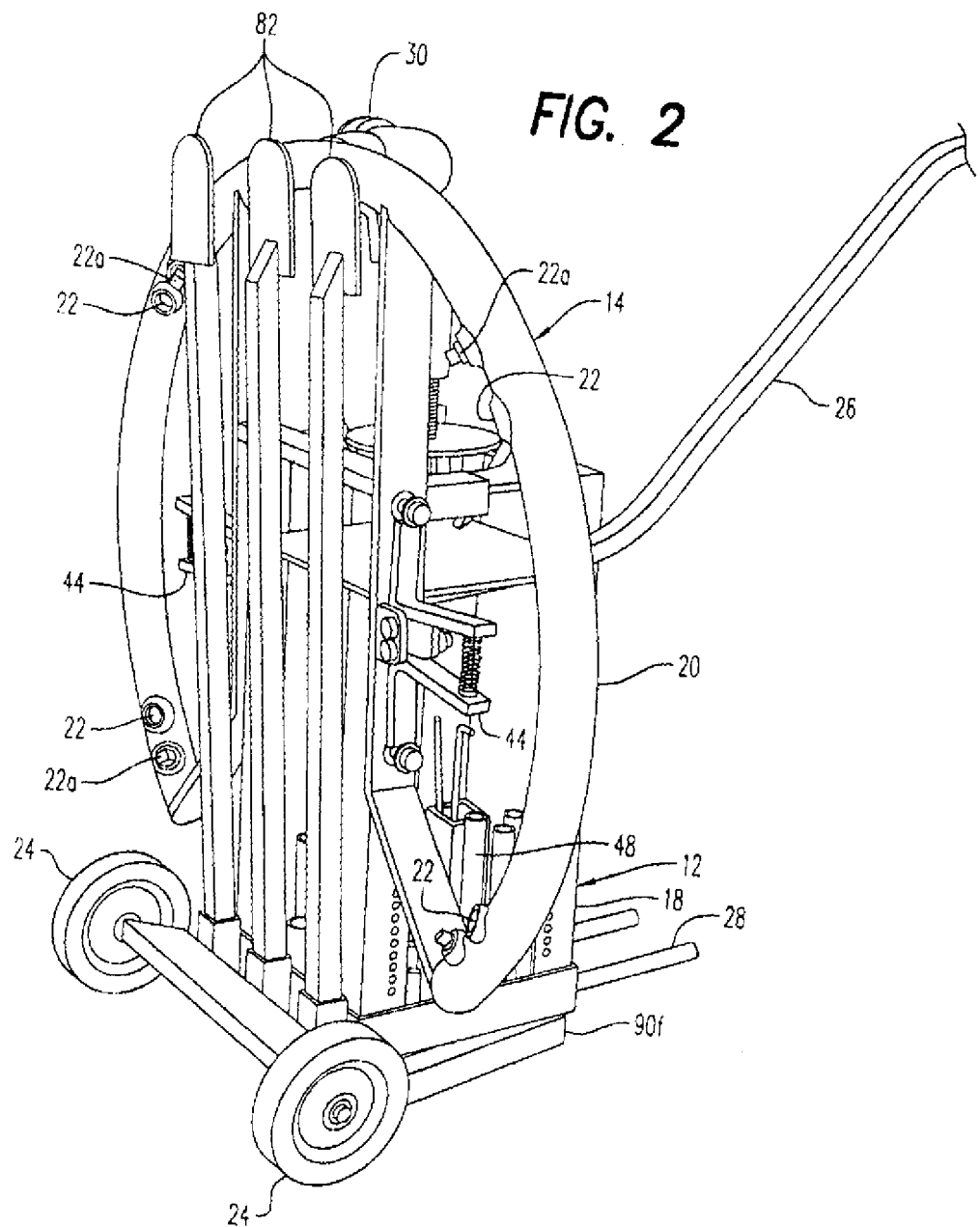
FIG. 2 is a rear perspective view of FIG. 1 with the air chamber removed.
Figure 3:
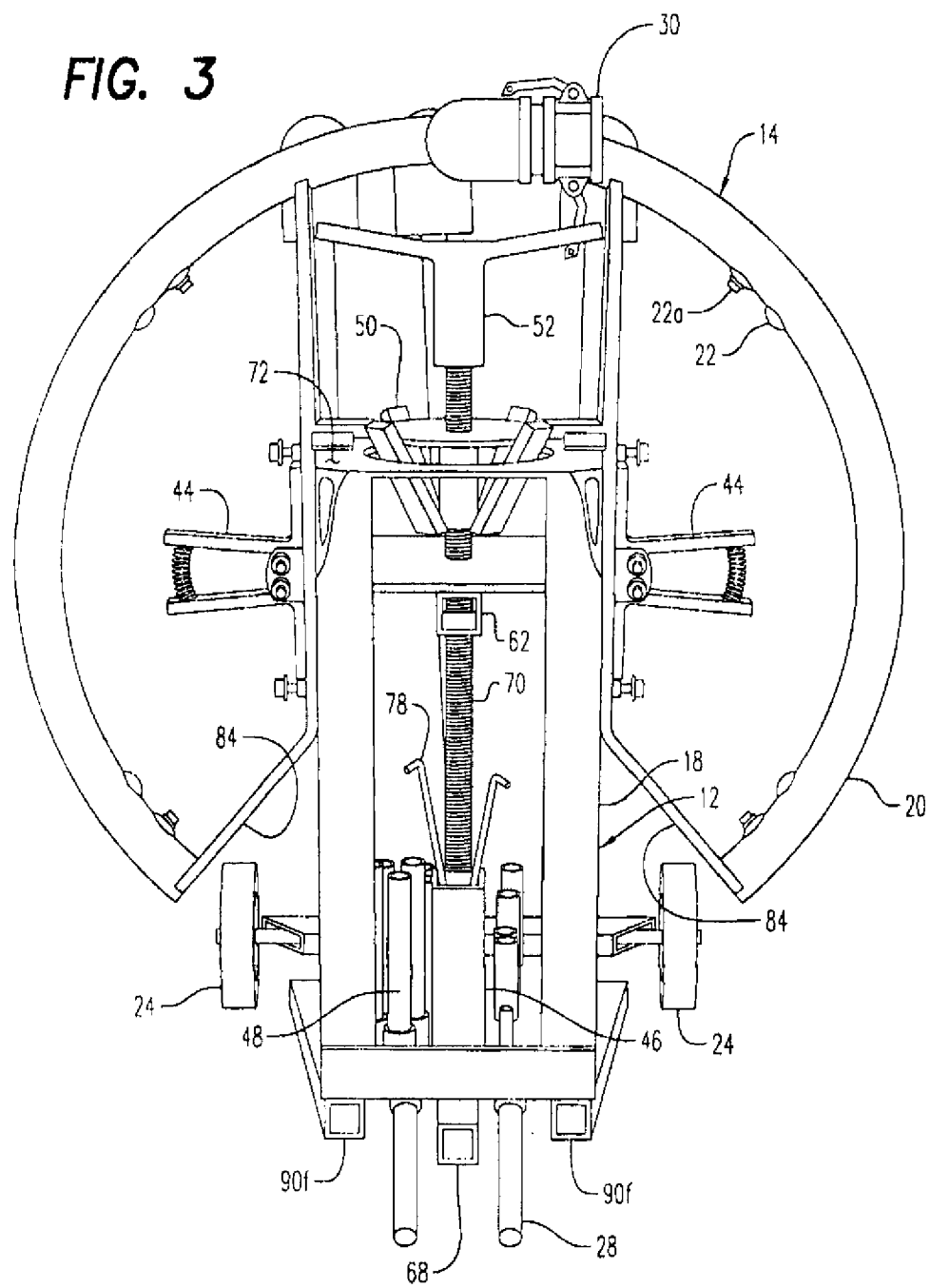
FIG. 3 is a front perspective view of FIG. 2.

Referring now to the drawings, and firstly to FIGS. 1 to 3, the invention is there shown generally at numeral 10 in FIG. 1 in a compact, stored configuration ready for portable movement. The invention 10 generally includes an upright rigid metal support frame assembly 12, a generally circular air ring assembly 14 and a compressed air tank assembly 16. The compact portability demonstrated in these figures is achieved by the storage of the air ring assembly 14 in a vertical orientation on the support frame assembly 12 and support of the air tank assembly 16 on horizontally extending air tank assembly supports 28 which are, as best seen in FIG. 3, rigidly connected to and horizontally extending just above the ground.

A wheel rim retainer 50 nests securely within the central opening of a flat wheel support surface 72 of the support frame 18 and is held in place by the threadable engagement of the rim lock 52 threaded onto the upright central threaded shaft 70. The removable handle 26 is held for use in handle support tube 62 and storable in the upright storage tube 46 attached as a part of the upright support frame 18. Spaced apart rear support wheels 24 connected as shown to the lower portion of the support frame 18 facilitate the transportability of the stored invention 10 or the support frame assembly 12 utilizing the releasable handle 26 in a conventional manner.

Figure 6:
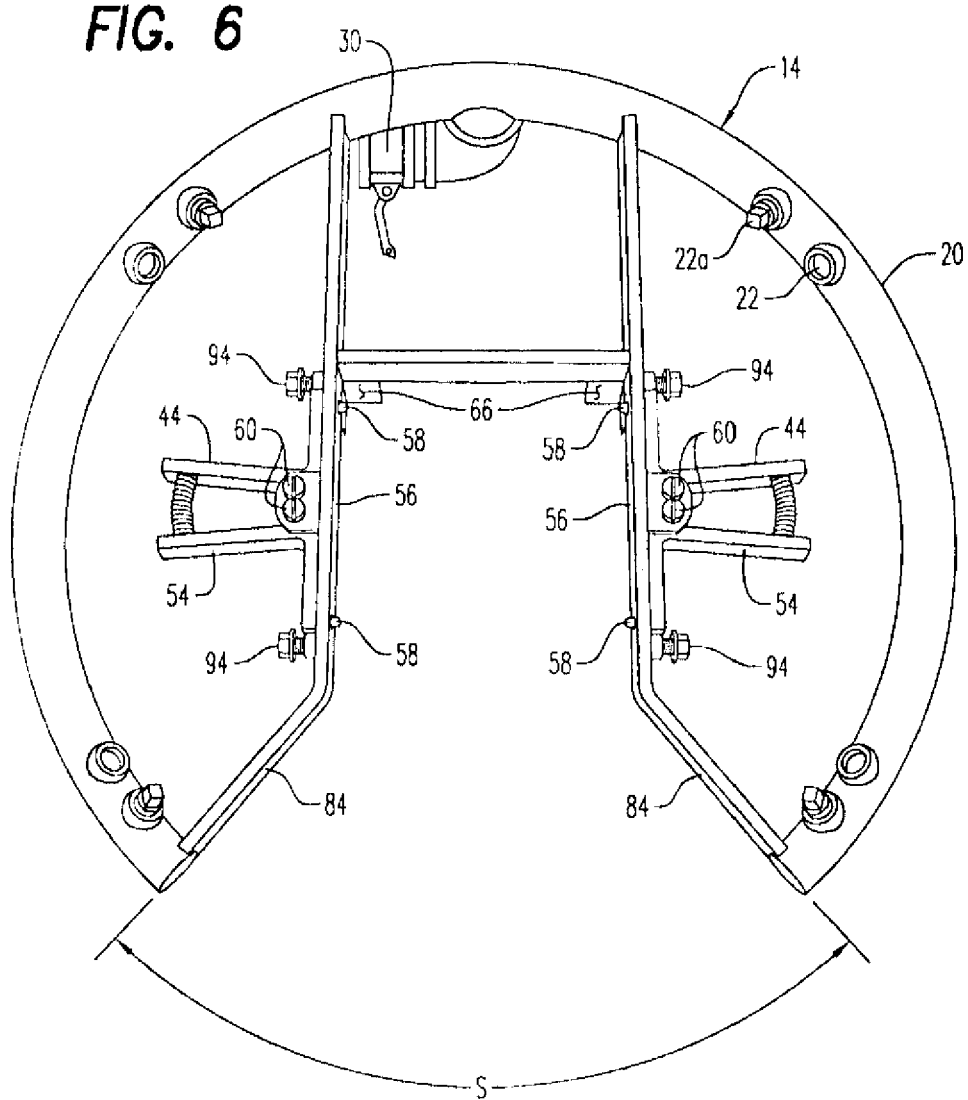
FIG. 6 is a plan view of the air ring assembly of the invention.
Figure 7:
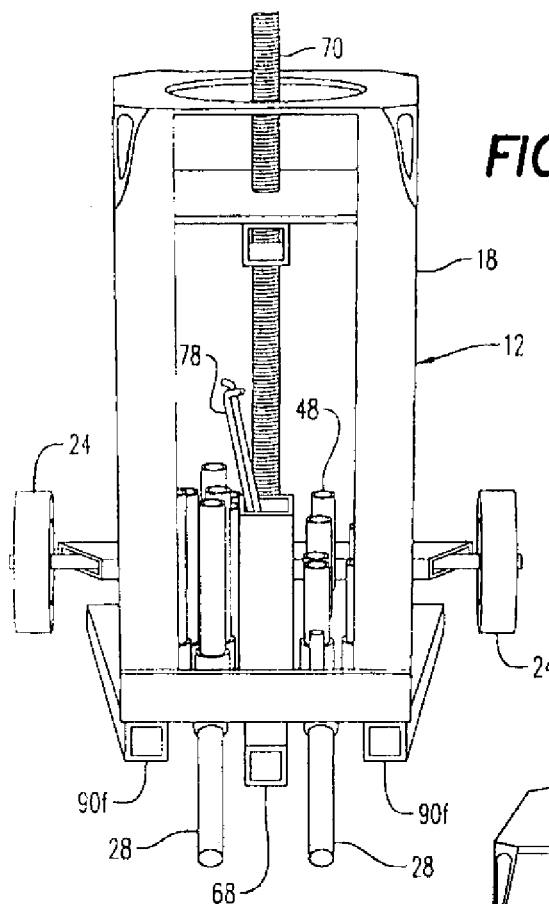
FIG. 7 is a front perspective view of the main support frame assembly.
Figure 8:
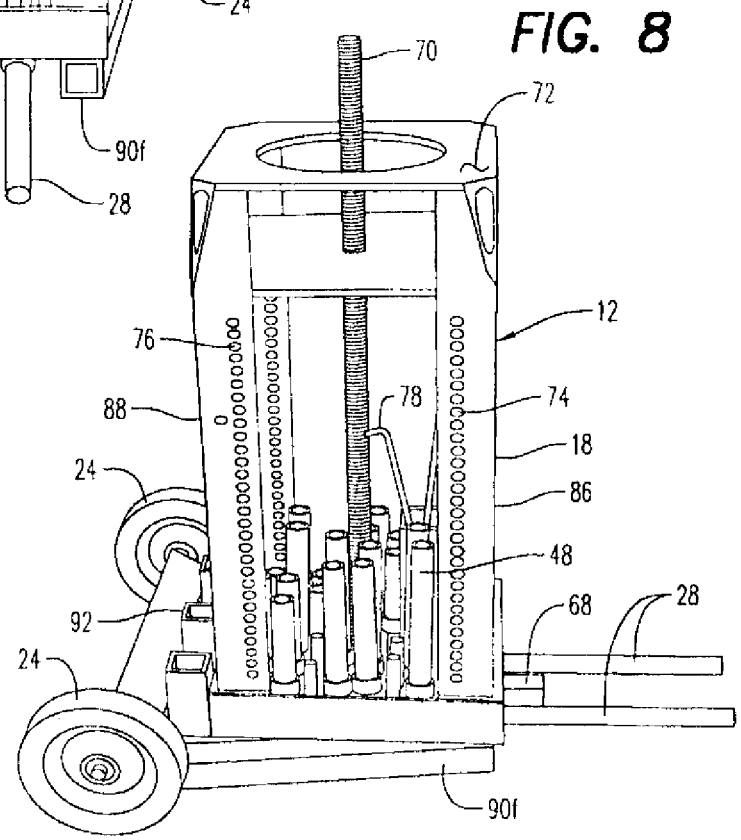
FIG. 8 is a right side perspective view of FIG. 7.

To begin to deploy the apparatus 10, after the air tank assembly 16 is removed and positioned for use adjacent to the support frame assembly 12, the air ring assembly 14 is removed from stored releasable attachment on the support frame 18 by the squeezing together both of the locking pin release levers 54 of each air ring locking member 44 as best seen in FIGS. 4 to 6. By squeezing the air ring locking member 44 together as shown in FIG. 5, the outward lever arms 54a pivot about pin attachment points 60 so as to retract air ring locking pins 58 connected to each lever arm 54a and orthogonally disposed adjacent each end of each lever arm 54a from mating apertures 64 formed through an air ring mounting plate 56 of the air ring 20. Referring also to FIG. 8, each of the upright frame corner angles 86 and 88 on each side of the support frame 18 include a series or column of closely spaced positioning rod receiving holes 74 and 76, respectively. To retain the air ring assembly 14 in the stored position shown in FIGS. 1 to 3, each pair of air ring locking pins 58 engage into two of the correspondingly spaced receiving holes 74 or 76, the vertical positioning of which is established by the supportive contact of surface 66 atop the corners of the wheel support surface 72. To effect release of the air ring assembly 14, both of the locking members 44 are squeezed and the air ring assembly 14 may then be lifted free.

Referring particularly to FIG. 6, the air ring assembly 14 includes an elongated circular air ring 20 which extends through a substantial portion of a 360° arc reduced by the angular or arcuate sector S which is about 90°. Therefore, the preferred embodiment of the air ring 20 extends through approximately 370° of arcuate sector angle. The tubular material utilized to form the air ring 20 is approximately 1½" I.D. and includes an air ring inlet port 30 of a conventional design. The previously described air ring locking members 44 include stops 94 which prevent over squeezing of the air ring locking members 44 together. The open arcuate sector S defined by air ring guide plates 84 extend inwardly toward one another to air ring mounting plates 56 which are spaced apart to slidably engage along the outwardly facing side surfaces of the support frame 18 as best seen in FIGS. 9 and 10.

Figure 9:
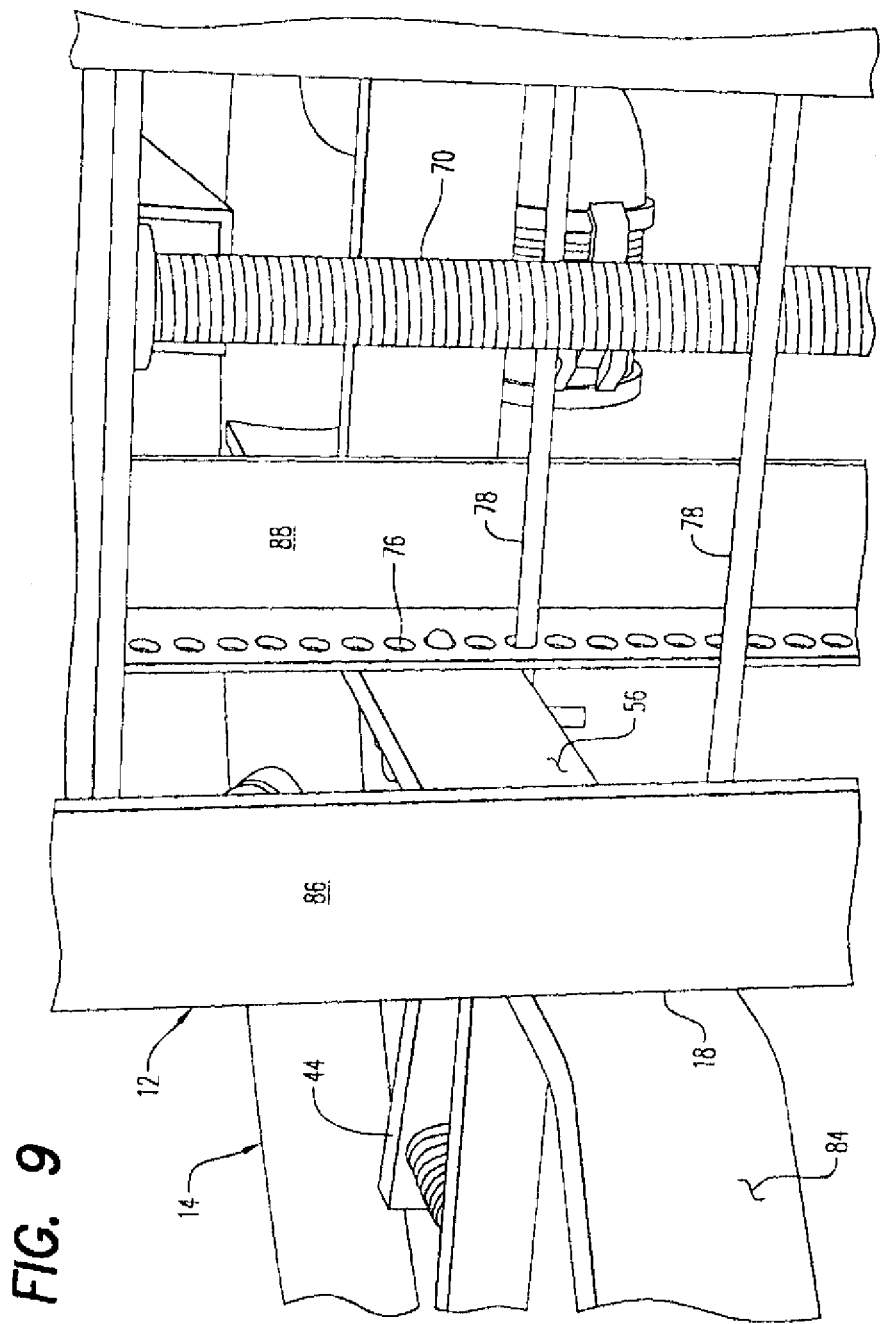
FIG. 9 is an enlarged perspective view of the temporary air ring positioning rods facilitating vertical adjustability of the air ring assembly.
Figure 10:
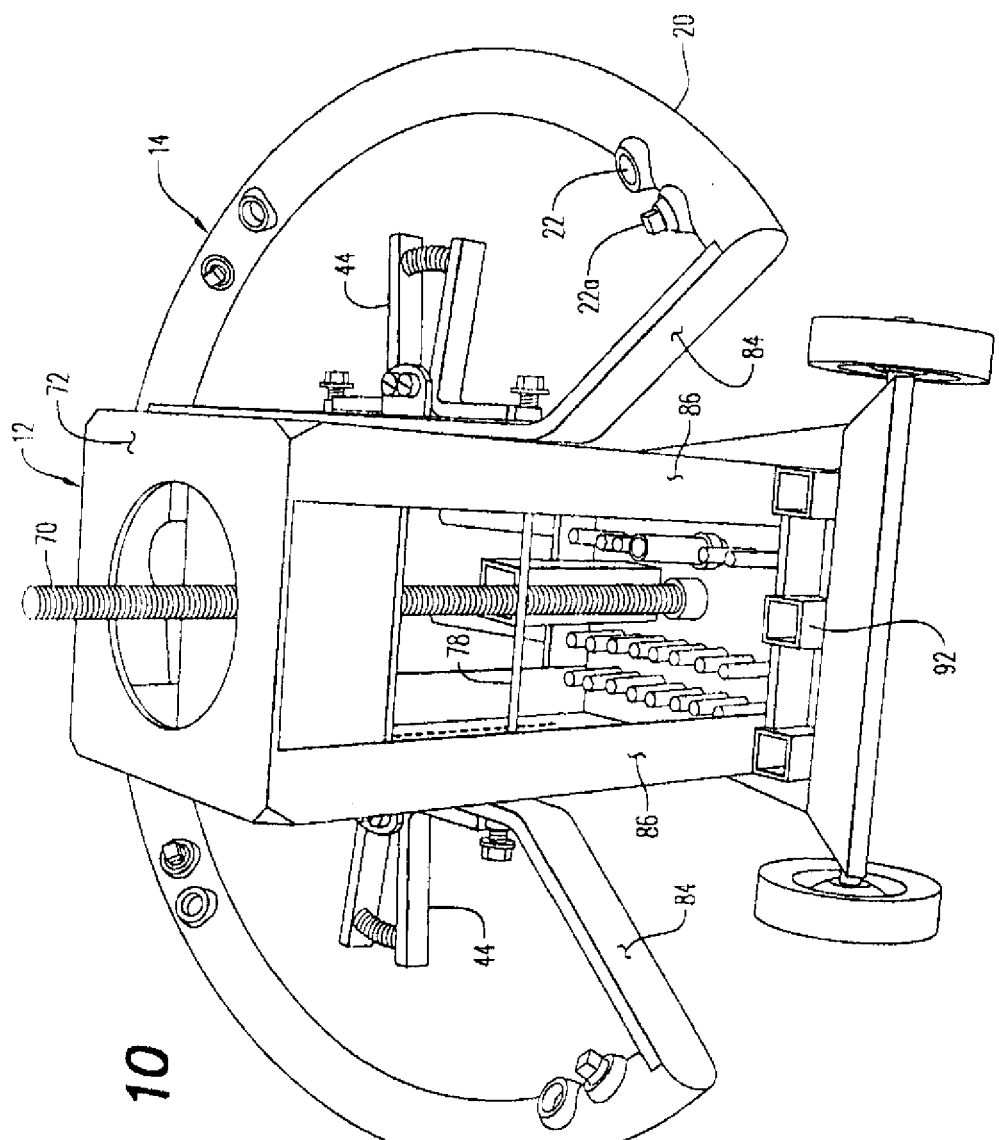
FIG. 10 is a rear perspective view of the ring assembly releasably connected to the main support frame assembly.

As also best seen in FIGS. 9 and 10, two air ring positioning rods 78 are provided for the temporary trial placement of the air ring 20 around the support frame 18. By "guestimating" a desired vertical positioning of the air ring 20 (as will be described in detail herebelow), each of the positioning rods 78 is slid through two vertically aligned pairs of receiving holes 74 and 76, after which the air ring assembly 14, being grasped as shown in FIG. 5, may be released from the stored position on the support frame 18 and repositioned to rest atop the positioning rods 78 as seen in FIG. 10. Thereafter, the locking members 44 are manually released, whereupon the locking pins 58 engage into one of the vertically aligned hole pairs 74 and 76 to secure the air ring assembly 14 in proper horizontal position for use.

Figure 11:
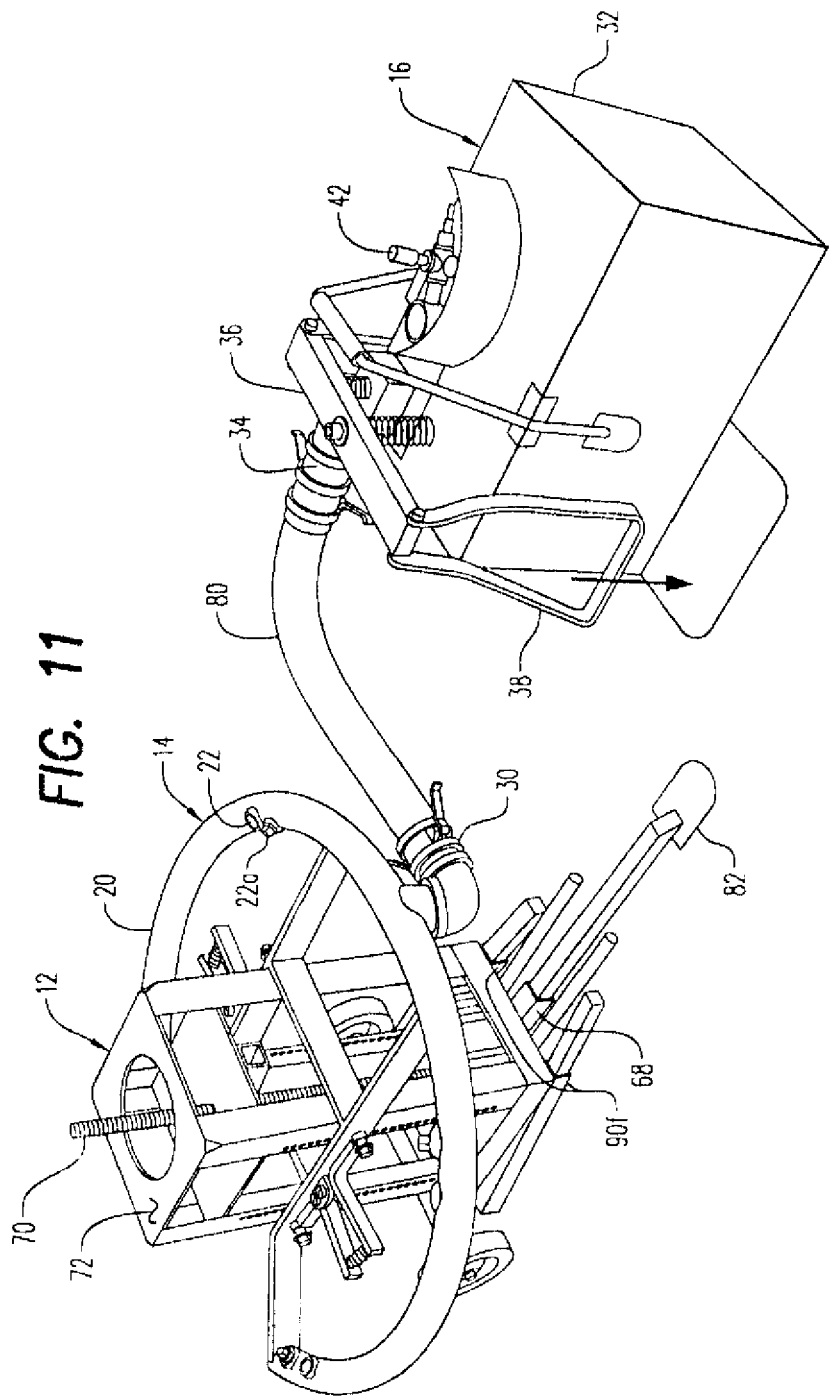
FIG. 11 is a perspective view of the invention deployed ready for use.

As seen in FIG. 11, a final step before operation is to connect the air tank outlet 34 to the air ring inlet port 30 via a flexible air conduit 80. At a prescribed moment described herebelow, at least a portion of the compressed air volume held within the compressed air tank 32 is released by downward foot actuation of foot pedal 38 in the direction of the arrow shown in FIGS. 1 and 11. This causes the lever arm 36 to pivot downwardly and to open an air release valve 40 causing a large quantity of compressed air (up to about 120 p.s.i.) to be released into the air ring 20. Valve/gauge assembly 42 monitors both progress of filling and emptying of the air tank 32.

Figure 12:
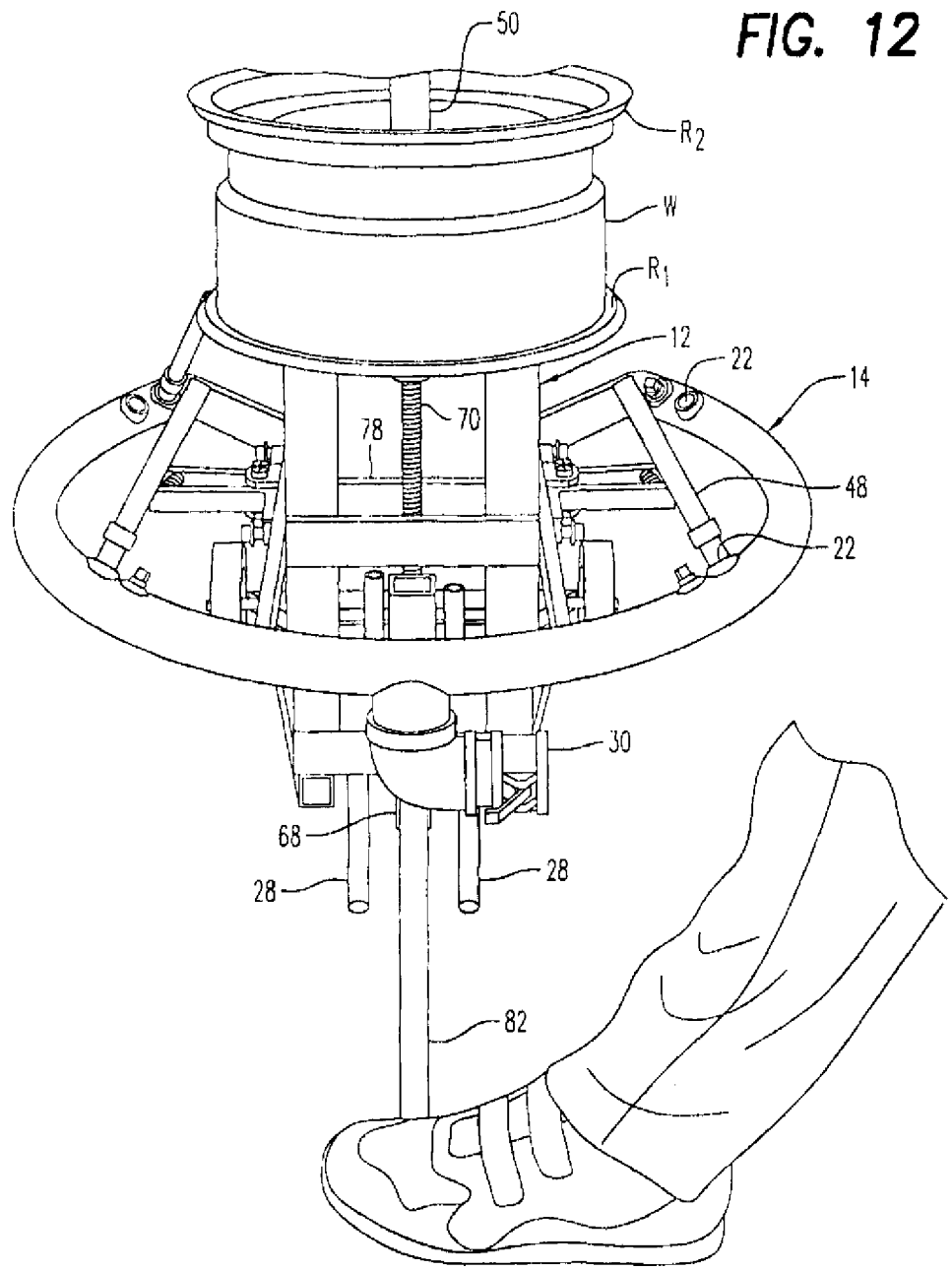
FIG. 12 is a broken perspective view of the invention in use.
Figure 13:
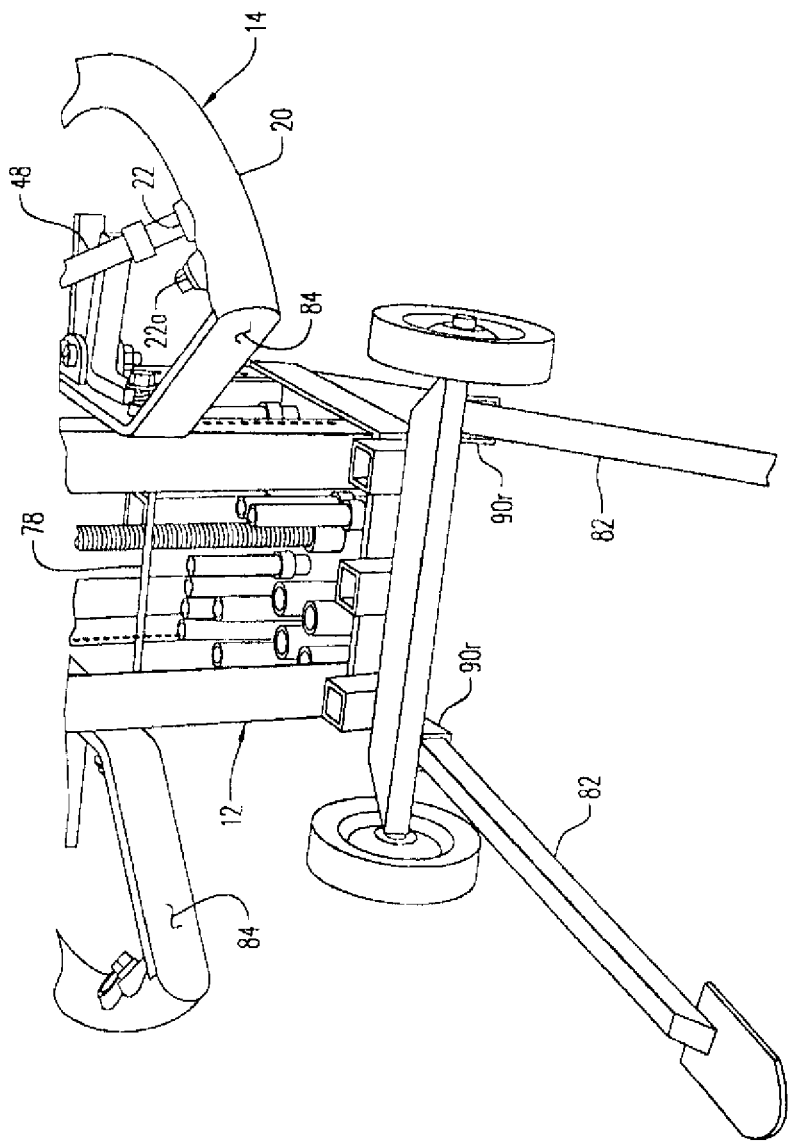
FIG. 13 is an enlarged rear perspective view of FIG. 12.
Figure 14:
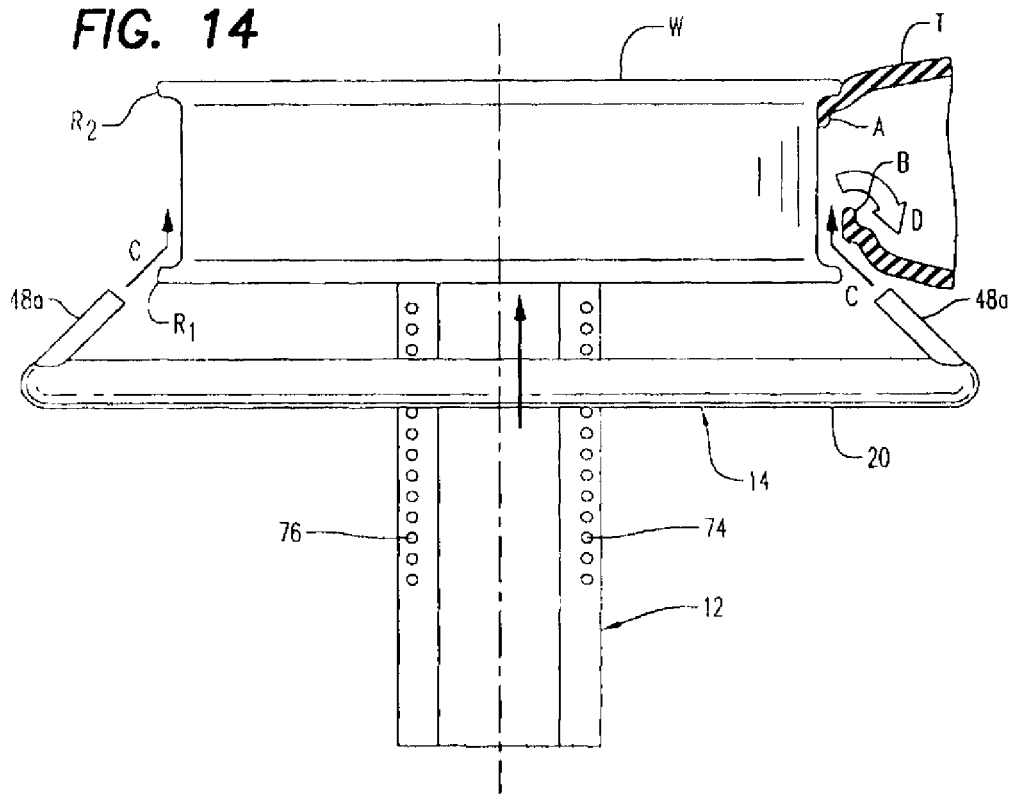
Figure 15:
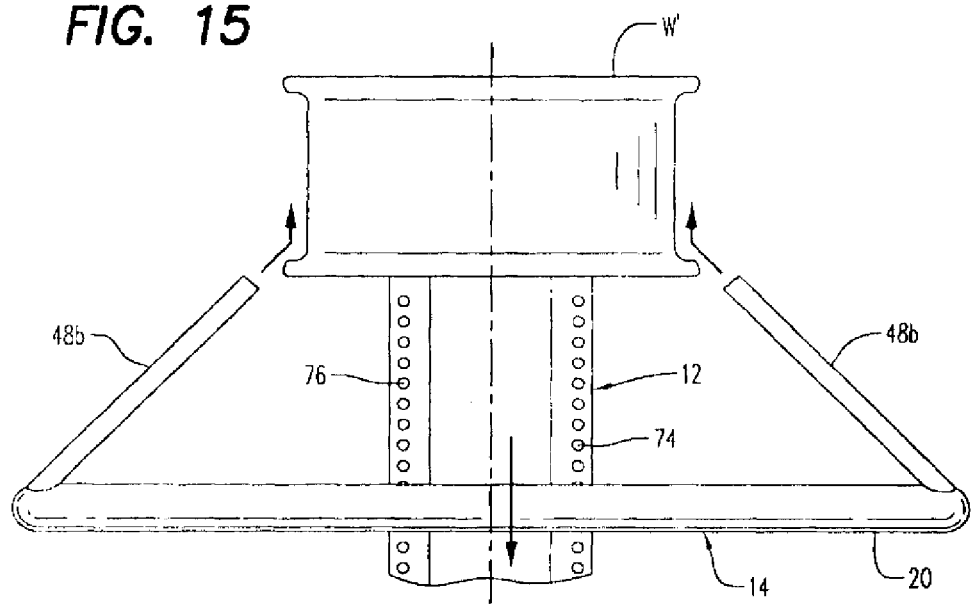

Referring now to FIGS. 12 and 13, a conventional wheel rim W is there shown secured in place atop the wheel support surface 72 (not seen in these figures) by the tightening of the wheel rim retainer 50 onto the threaded upright mounting shaft 70. Because the preferred embodiment of this invention is portable, to prevent movement of the apparatus during use, three separate foot hold-down members 82 are provided. One of these hold-down members 82 may be inserted into and be positioned against the ground or support surface through each and any of a center foot hold-down support tube 68, and/or through rearwardly extending foot hold-down member support tubes 90r. Alternately, one or both of the hold-down members 82 may be inserted into the forwardly end 90f of the support tubes 90.

Figure 14:
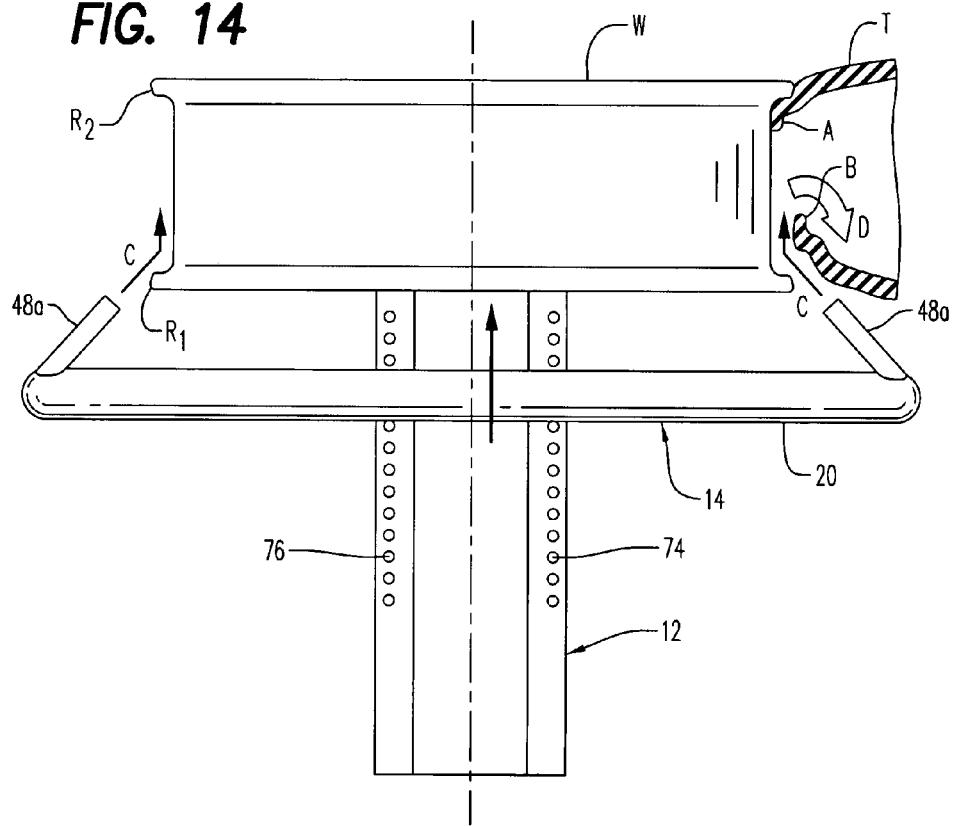
FIG. 14 is a simplified schematic view of the invention in use with respect to a large diameter narrower rim and tire.
Figure 15:
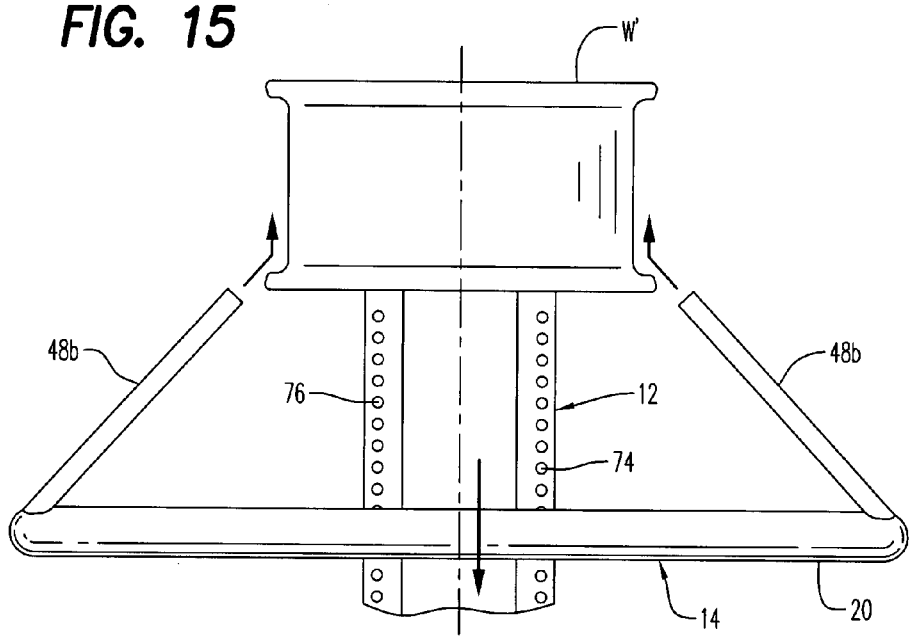
FIG. 15 is a view similar to FIG. 14 showing the invention in use in conjunction with a smaller diameter wider rim and demonstrating the adjustability of the invention to various rim diameters and widths.

Referring also to FIGS. 14 and 15, once the tire T has been manipulated onto the wheel rim W in loosely fitted fashion, the air ring assembly 14 is vertically readjusted if necessary through the use of air ring positioning rods 78 and then lockably secured in the new position by the release of the locking members 44 to obtain best alignment of the distal ends of a plurality of air discharge tubes generally referred to at 48. As determined by the diameter of the wheel rim W, the best lengths for a set of the air discharge tubes 48 stored in upright fashion as best seen in FIGS. 8 and 13 are selected and threadably engaged into female threaded air ring outlet ports 22 which are in fluid communication with the hollow interior of the air ring 20 and the inlet port 30. By proper vertical positioning of the air ring 20 in the appropriate pairs of receiving holes 74 and 76, the best positioning for the distal open ends of each of the (preferably four) air discharge tubes 48a is established.

When the compressed air charged within the air tank assembly 16 is released by downward actuation of the foot pedal 38, a very large high pressure volume of compressed air is released from the discharge tubes 48a collectively so as to be forced into the interior of the tire T through the gap in the direction of arrow C and then downwardly in the direction of arrow D to force the lower sidewall of the tire T into sealing engagement of the bead B against the lower rim seal $R_1$. Simultaneously, air is fed into the tire T through an air fill valve (not shown), the tire T is manually lifted slightly (by preferably two persons where the tire is large and heavy to establish a temporary sealing engagement of tire bead A against rim seal $R_2$ to quickly establish a sealed relationship for further pressurized filling of the interior of the tire T through the fill valve. With both tire beads A and B now temporarily sealed, the interior of the tire T is fully pressurized to complete the bead engagement.

As seen in FIG. 15, a rim W' of smaller diameter and larger width may also be easily accommodated by the present invention by the utilization of a longer series or set of air discharge tubes 48b, in combination with the lowering of the air ring 20 on support frame assembly 12 and locked into the position selected within receiving holes 74 and 76 as previously described. Again, the distal open end of these discharge tubes 48b are ideally positionable to direct the discharging air in the direction of arrows against the interior surface of the wheel rim W' just above the lower seal of the rim W' as previously described.

In an extreme situation where the combination of variables shown in FIGS. 14 and 15 will not achieve an ideal location of the distal discharge ends of the discharge tubes 48, a second set of outlet ports 22a best seen in the various figures formed into the inner arcuate surface of the air ring 20 are provided. These alternate outlet ports 22a are oriented at an angle of approximately 30° with respect to the vertical axis of the apparatus rather than at approximately 45° for the outlet ports 22 previously described. These alternate outlet ports 22a are kept plugged so as to maintain the sealing engagement within the air ring 20 until such time as the alternate orientation of one of the series of selected lengths of air discharge tubes 48a, b . . . is selected for use.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A portable universal apparatus for seating a bead of a wide range of sizes of tubeless tires on a wheel rim comprising:
    a main support frame;
    a rigid tubular air ring;
    a compressed air tank for holding a large quantity of compressed air and including an air discharge valve;
    said support frame including a wheel rim support surface and a wheel rim retainer for securing the rim in a generally horizontal position atop said rim support surface;
    said air ring including an air inlet port connectable to said air discharge valve and being connectable to and supported by said support frame in a generally horizontal position lower than said wheel rim support surface;
    said air ring being vertically adjustably positionable on said support frame and including a plurality of air discharge ports spaced around a length of said air ring, each of said discharge ports receiving one of a plurality of air discharge tubes, each said discharge port angularly oriented to position each discharge tube at an acute angle with respect to an upright central axis of the wheel rim;
    said plurality of air discharge tubes being of differing lengths which cooperate with the vertical adjustability of said air ring to position an open upper distal end of each of said air discharge tubes in close proximity between a lower rim seal and a lower sealing bead of a tire whereby the lower sealing bead of a tire loosely mounted on the rim is forced downwardly into sealing engagement with the lower rim seal when a portion of compressed fluid in said air tank is released into said air ring and discharges from each of said air discharge tubes.

2. An apparatus as set forth in claim 1, further comprising:
    two elongated air ring positioning rods each insertable through one of a series of vertically spaced apertures formed in said support frame, each said rod extending beyond opposing side surfaces of said support frame sufficiently when in to temporarily support said air ring at a height beneath said rim support surface for trial alignment of the distal ends of the selected discharge tubes.

3. An apparatus as set forth in claim 1, further comprising:
    support wheels and a pull handle connected or releasably connectable, respectively, to said support frame for rollingly moving said apparatus when in a stored configuration and for rollingly moving said support frame and attached air ring.

4. An apparatus as set forth in claim 3, further comprising:
    removable elongated foot restraint bars releasably connectable to said support frame and being adapted to receive a foot of a user to restrain said support frame and attached said air ring during use.

5. An apparatus as set forth in claim 1, wherein:
    said air tank and said air ring are compactly storable on said support frame when said apparatus is not in use.

6. An apparatus as set forth in claim 1, further comprising:
    a plurality of second air discharge ports each of which is connected to said air ring and positioned adjacent to one of said air discharge ports, said second air discharge ports being oriented to position each discharge tube at a second acute angle with respect to the central axis.

7. A portable universal apparatus for seating a bead of a wide range of sizes of tubeless tires on a wheel rim comprising:
    a main upright support frame;
    a tubular air ring extending through an arcuate sector of greater than 180° to define a support frame receiving opening, said air ring having an air inlet port connectable to an air discharge valve of a compressed air tank;
    said support frame receiving opening being positionable around said support frame;
    said support frame including a wheel rim support surface and a wheel rim retainer for securing the rim in a generally horizontal position atop said rim support surface;
    said air ring being vertically adjustable and connectable in a generally horizontal orientation on said support frame beneath said rim support surface;
    said air ring including a plurality of air discharge ports spaced around a length of said air ring, each of said discharge ports receiving one of a set of air discharge tubes, each said set having discharge tubes of a different length, each said discharge port angularly oriented to position each said air discharge tube of a selected set thereof at an acute inward angle and generally concentric with respect to an upright central axis of the wheel rim;
    said air discharge tubes of each set being sized in length and selected to cooperate with the vertical adjustability of said air ring on said support frame to position an open upper distal end of each selected said set of air discharge tubes in close proximity between a lower rim seal and a lower sealing bead of a tire whereby the lower sealing bead of a tire loosely mounted on the rim is forced downwardly into sealing engagement with the lower rim seal when a portion of compressed fluid in said air tank is released into said air ring and discharges from each of said air discharge tubes.

8. An apparatus as set forth in claim 7, further comprising:
    two elongated air ring positioning rods each insertable through one of a series of vertically spaced apertures formed in said support frame, each said rod extending beyond opposing side surfaces of said support frame sufficiently when in to temporarily support said air ring at a height beneath said rim support surface for trial alignment of the distal ends of the selected discharge tubes.

9. An apparatus as set forth in claim 7, further comprising:
    support wheels and a pull handle connected or releasably connectable, respectively, to said support frame for rollingly moving said apparatus when in a stored configuration and for rollingly moving said support frame and attached air ring.

10. An apparatus as set forth in claim 9, further comprising:
    removable elongated foot restraint bars releasably connectable to said support frame and being adapted to receive a foot of a user to restrain said support frame and attached said air ring during use.

11. An apparatus as set forth in claim 7, wherein:

said air tank and said air ring are compactly storable on said support frame when said apparatus is not in use.

12. An apparatus as set forth in claim 7, further comprising:

a plurality of second air discharge ports each of which is connected to said air ring and positioned adjacent to one of said air discharge ports, said second air discharge ports being oriented to position each discharge tube at a second acute angle with respect to the central axis.

13. A portable universal apparatus for seating a bead of a wide range of sizes of tubeless tires on a wheel rim comprising:

a main support frame;

a rigid tubular air ring;

a compressed air tank for holding a large quantity of compressed air and including an air discharge valve;

said support frame including a wheel rim support surface and a wheel rim retainer for securing the rim in a generally horizontal position atop said rim support surface;

said air ring including an air inlet port connectable to said air discharge valve and being connectable to and supported by said support frame in a generally horizontal position lower than said wheel rim support surface;

said air ring being vertically adjustably positionable on said support frame and including a plurality of air discharge ports spaced around a length of said air ring, each of said discharge ports receiving one of a plurality of air discharge tubes, each said discharge port angularly oriented to position each discharge tube at an acute angle with respect to an upright central axis of the wheel rim;

said plurality of air discharge tubes being of differing lengths which cooperate with the vertical adjustability of said air ring to position an open upper distal end of each of said air discharge tubes in close proximity between a lower rim seal and a lower sealing bead of a tire whereby the lower sealing bead of a tire loosely mounted on the rim is forced downwardly into sealing engagement with the lower rim seal when a portion of compressed fluid in said air tank is released into said air ring and discharges from each of said air discharge tubes;

two elongated air ring positioning rods each insertable through one of a series of vertically spaced apertures formed in said support frame, each said rod extending beyond opposing side surfaces of said support frame sufficiently when in to temporarily support said air ring at a height beneath said rim support surface for trial alignment of the distal ends of the selected discharge tubes;

support wheels and a pull handle connected or releasably connectable, respectively, to said support frame for rollingly moving said apparatus when in a stored configuration and for rollingly moving said support frame and attached air ring;

removable elongated foot restraint bars releasably connectable to said support frame and being adapted to receive a foot of a user to restrain said support frame and attached said air ring during use;

said air tank and said air ring being compactly storable on said support frame when said apparatus is not in use;

a plurality of second air discharge ports each of which is connected to said air ring and positioned adjacent to one of said air discharge ports, said second air discharge ports being oriented to position each discharge tube at a second acute angle with respect to the central axis.

* * * * *

UNITED STATES PATENT AND TRADEMARK OFFICE
CERTIFICATE OF CORRECTION

| | | |
|---|---|---|
| PATENT NO. | : 7,311,129 B1 | Page 1 of 14 |
| APPLICATION NO. | : 11/786067 | |
| DATED | : December 25, 2007 | |
| INVENTOR(S) | : William D. White | |

It is certified that error appears in the above-identified patent and that said Letters Patent is hereby corrected as shown below:

The title page should be deleted and substitute therefor the attached title page.

Drawings:

Delete drawing sheets 1-12 and substitute therefore the drawing sheets 1-12 consisting of Figs. 1-15 as shown on the attached pages.

Signed and Sealed this

Fourteenth Day of April, 2009

JOHN DOLL
*Acting Director of the United States Patent and Trademark Office*

(12) United States Patent
White

(10) Patent No.: US 7,311,129 B1
(45) Date of Patent: Dec. 25, 2007

(54) TIRE BEAD SEATING AND INFLATING APPARATUS

(76) Inventor: William D White, P.O. Box 5791, Bradenton, FL (US) 34281

(*) Notice: Subject to any disclaimer, the term of this patent is extended or adjusted under 35 U.S.C. 154(b) by 0 days.

(21) Appl. No.: 11/786,067

(22) Filed: Apr. 10, 2007

(51) Int. Cl.
B60C 25/06 (2006.01)
(52) U.S. Cl. ............... 157/1.11; 156/1.17; 156/1.2; 73/146
(58) Field of Classification Search ............ 157/1, 157/1.11, 1.17, 1.2; 141/38, 95; 73/146
See application file for complete search history.

(56) References Cited

U.S. PATENT DOCUMENTS

| 3,552,469 | A | 1/1971 | Corless |
| 3,677,320 | A * | 7/1972 | Corless .............. 157/1.1 |
| 3,683,991 | A * | 8/1972 | Ruhland et al. ...... 157/1.1 |
| 3,736,975 | A | 6/1973 | Strang et al. |
| 3,805,871 | A | 4/1974 | Corless |
| 3,814,163 | A | 6/1974 | Charles |
| 3,866,654 | A | 2/1975 | Duquesne |
| 4,263,958 | A | 4/1981 | Corless |
| 5,042,547 | A | 8/1991 | Van De Sype |
| 5,247,982 | A * | 9/1993 | Miller ................ 157/1.1 |
| 5,509,456 | A | 4/1996 | Bonko et al. |
| 6,463,982 | B1 | 10/2002 | Doan |
| 7,188,518 | B2 | 3/2007 | Gonzaga |

* cited by examiner

Primary Examiner—Joseph J. Hail, III
Assistant Examiner—Anthony Ojini
(74) Attorney, Agent, or Firm—Charles J. Prescott

(57) ABSTRACT

A portable universal apparatus for seating a bead of a wide range of tire sizes onto a rim. An upright support frame includes a rim support surface and a rim retainer for securing the rim in a generally horizontal position atop the rim support surface. A tubular air ring includes an air inlet port connectable to an air tank and is vertically adjustably supportable on the support frame. A plurality of inwardly oriented air discharge tubes connectable to the air ring and selectable from different sets of lengths thereof cooperate with the vertical adjustability of the air ring to position the distal end of each of discharge tube in close proximity between a lower rim seal and a lower sealing bead of the tire to force the lower sealing downwardly into sealing engagement with the lower rim seal when compressed air is released from the air tank into the air ring and air discharge tubes.

13 Claims, 12 Drawing Sheets

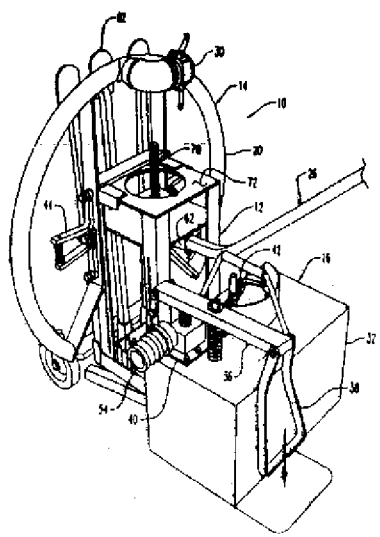
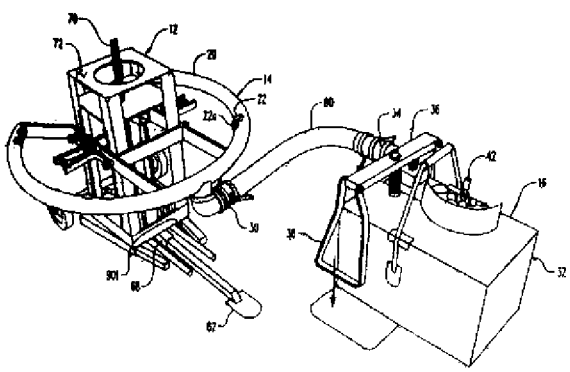

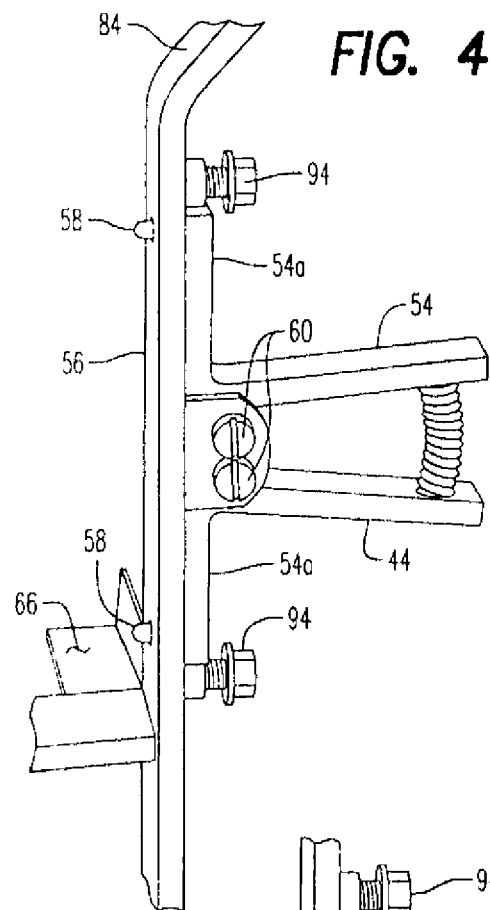
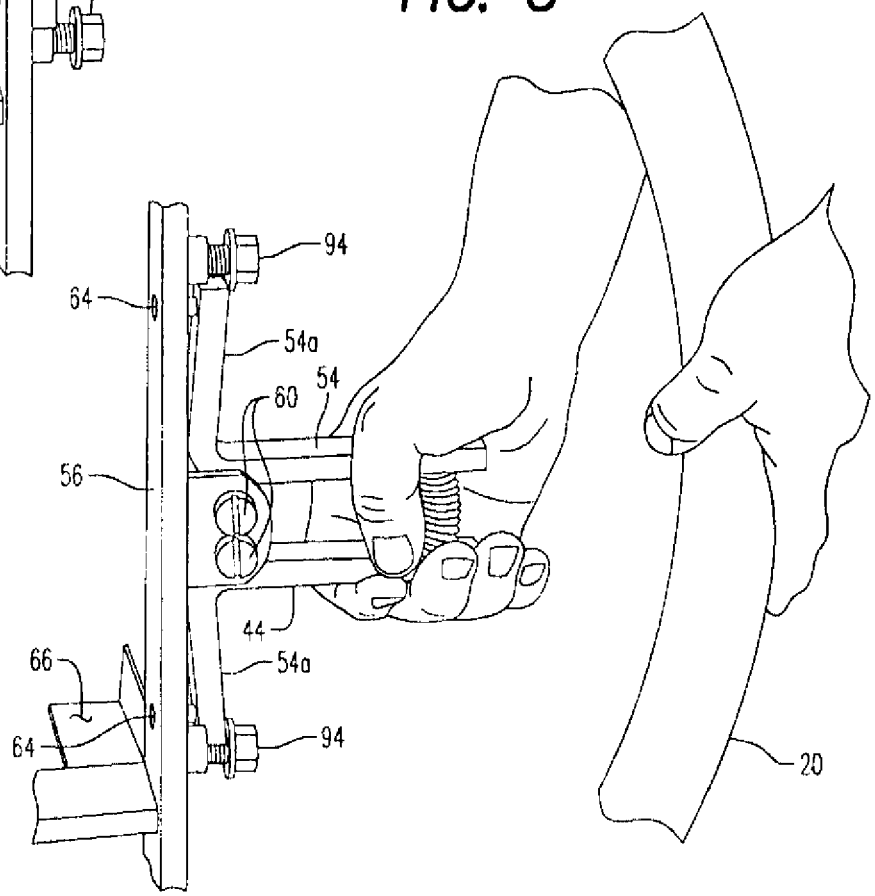
FIG. 4
FIG. 5